US012794792B2

(12) United States Patent
Allen

(10) Patent No.: US 12,794,792 B2
(45) Date of Patent: Nov. 10, 2026

(54) SYSTEMS AND METHODS FOR DETECTING ANOMALIES IN INTERNET TRAFFIC USING BENFORD'S LAW AND POISSON PROCESSES

(71) Applicant: Government of the United States as represented by the Secretary of the Air Force, Wright-Patterson AFB, OH (US)

(72) Inventor: Thomas Allen, New Braunfels, TX (US)

(73) Assignee: United States of America as represented by the Secretary of the Air Force, Wright-Patterson, OH (US)

( * ) Notice: Subject to any disclaimer, the term of this patent is extended or adjusted under 35 U.S.C. 154(b) by 23 days.

(21) Appl. No.: 19/191,069

(22) Filed: Apr. 28, 2025

(65) Prior Publication Data

US 2025/0358202 A1 Nov. 20, 2025

Related U.S. Application Data

(60) Provisional application No. 63/647,267, filed on May 14, 2024.

(51) Int. Cl.
*G06F 15/16* (2006.01)
*H04L 9/40* (2022.01)
*H04L 43/04* (2022.01)

(52) U.S. Cl.
CPC .......... *H04L 43/04* (2013.01); *H04L 63/1425* (2013.01)

(58) Field of Classification Search
CPC .......................... H04L 63/1425; H04L 41/142
See application file for complete search history.

(56) References Cited

U.S. PATENT DOCUMENTS

2022/0159022 A1* 5/2022 Aghamirzaei ..... G06Q 30/0248
2023/0353583 A1* 11/2023 Prandl .................. G06F 21/552

OTHER PUBLICATIONS

NPL, Detection and Classification of Malicious Patterns in Network Traffic Using Benford's Law, Sun et al., Conference proceedings, 2017 (Year: 2017).*
NPL, Benford's law behavior of Internet traffic, Journal of Network and Computer Applications, Laleh Arshadi et al. 2014 (Year: 2014).*

* cited by examiner

*Primary Examiner* — Padma Mundur
(74) *Attorney, Agent, or Firm* — AFMCLO/JAZ; John T. Addicks

(57) ABSTRACT

A method of determining anomalous Internet traffic includes: defining a time window across which to apply a Poisson distribution; modeling expected Internet traffic including, at least, an average rate of requests per unit time, using Poisson distribution based on historical traffic data for one or more multiples of the time window; recording data related to real time Internet traffic for, at least, one multiple of time window; analyzing data related to the real time Internet traffic to include extracting lead digits from one or more parameters of data related to real time Internet traffic including: calculating a frequency distribution of the extracted lead digits; comparing the calculated frequency distribution of the extracted lead digits to a Benford's Curve distribution; comparing calculated frequency distribution of extracted lead digits to the modeled expected Internet traffic; and identifying deviations of compared frequency distribution to the Benford's Curve and the modeled expected Internet traffic.

15 Claims, 17 Drawing Sheets

1600

SYSTEMS AND METHODS FOR DETECTING ANOMALIES IN INTERNET TRAFFIC USING BENFORD'S LAW AND POISSON PROCESSES

CROSS REFERENCE TO RELATED APPLICATIONS

This patent application claims the benefit of U.S. Prov. Ser. No. 63/647,267 filed May 14, 2024, which is hereby incorporated by reference in its entirety.

RIGHTS OF THE GOVERNMENT

The technology described herein may be manufactured and used by or for the Government of the United States for all governmental purposes without the payment of any royalty.

FIELD OF THE TECHNOLOGY

The present technology relates generally to systems and methods for detecting anomalies in internet traffic and, more particularly, to systems and methods for detecting anomalies in internet traffic using Benford's Law and Poisson Processes.

BACKGROUND OF THE TECHNOLOGY

Internet traffic analysis is crucial for detecting and mitigating security threats in modern networks. Anomaly detection techniques play an increasingly critical role as cyber threats evolve. As cyberattacks become more sophisticated, early warning signs of an attack, such as code execution, persistence stealth, command control, and lateral movement within a network, are essential for defenders to identify. Contextual and behavioral analysis, delivered in real-time through machine learning and artificial intelligence, effectively detect and prevent attacks that conventional "defense-in-depth" technologies struggle to address.

A key challenge for defenders is to reduce the complexity of packet analysis. Reducing the complexity is vital as "breakout time" represents the speed with which an adversary can accomplish lateral movements in a victim's environment after an initial compromise. Rapid detection and response are crucial to containing or remediating an intrusion before it spreads widely, thereby minimizing the impact and escalation of the attack.

A previously-proposed rule, namely, the "1-10-60 rule," establishes specific timeframes for detecting, investigating, and eradicating intrusions to combat sophisticated cyber threats effectively. The rule recommends that detection should be conducted under one minute, investigation in 10 minutes, and eradication within 60 minutes. Although detecting intrusions in under a minute poses significant challenges, leveraging Benford's Law can significantly shorten the average time-to-detect, time-to-investigate, and time-to-remediate metrics, moving closer to this benchmark.

The systems and methods described herein may enable the achievement of one or more aspects of the "1-10-60 rule," and may enable detecting intrusions as rapidly as possible.

SUMMARY OF THE TECHNOLOGY

The present technology overcomes the foregoing problems and other shortcomings, drawbacks, and challenges of identifying malicious network traffic. While the technology will be described in connection with certain embodiments, it will be understood that the technology is not limited to these embodiments. To the contrary, this technology includes all alternatives, modifications, and equivalents as may be included within the spirit and scope of the present technology.

According to one embodiment of the present disclosure, a method of determining anomalous Internet traffic using Benford's Law includes: defining a time window across which to apply a Poisson distribution; modeling expected Internet traffic including, at least, an average rate of requests per unit time, using the Poisson distribution based on historical traffic data for one or more multiples of the time window; recording data related to real time Internet traffic for, at least, one multiple of the time window; analyzing the data related to the real time Internet traffic to include extracting lead digits from one or more parameters of the data related to real time Internet traffic including: calculating a frequency distribution of the extracted lead digits; comparing the calculated frequency distribution of the extracted lead digits to a Benford's Curve distribution; comparing the calculated frequency distribution of the extracted lead digits to the modeled expected Internet traffic; and identifying deviations of the compared frequency distribution to the Benford's Curve and the modeled expected Internet traffic.

According to another embodiment of the present disclosure, a method of differentiating benign and malicious internet traffic using Benford's Law and Poisson process includes: defining a time window across which to apply a Poisson distribution; modeling expected Internet traffic including, at least, an average rate of requests per unit time, using the Poisson distribution based on historical traffic data for one or more multiples of the time window; recording data related to real time Internet traffic for, at least, one multiple of the time window; analyzing the data related to the real time Internet traffic to include extracting lead digits from one or more parameters of the data related to real time Internet traffic, including: calculating a frequency distribution of the extracted lead digits; comparing the calculated frequency distribution of the extracted lead digits to a Benford's Curve distribution; comparing the calculated frequency distribution of the extracted lead digits to the modeled expected Internet traffic; and identifying deviations of the compared frequency distribution to the Benford's Curve and the modeled expected Internet traffic using a deep learning model.

According to yet another embodiment of the present disclosure, a method of determining anomalous Internet traffic using Benford's Law comprising: defining a time window across which to apply a Poisson distribution; modeling expected inter-arrival times of packets from Internet traffic using the Poisson distribution based on historical traffic data for one or more multiples of the time window; recording data related to the inter-arrival times for, at least, one multiple of the time window; analyzing the inter-arrival times to include extracting lead digits from one or more parameters of the data related to the inter-arrival times including: calculating a frequency distribution of the extracted lead digits; comparing the calculated frequency distribution of the extracted lead digits to a Benford's Curve distribution; comparing the calculated frequency distribution of the extracted lead digits to the modeled expected inter-arrival times; and identifying deviations of the compared frequency distribution to the Benford's Curve and the modeled expected inter-arrival times.

Additional objects, advantages, and novel features of the technology will be set forth in part in the description which follows, and in part will become apparent to those skilled in the art upon examination of the following or may be learned by practice of the technology. The objects and advantages of the technology may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present technology and, together with a general description of the technology given above, and the detailed description of the embodiments given below, serve to explain the principles of the present technology.

FIG. TOA shows the results of unsupervised learning.

Figure 10A:
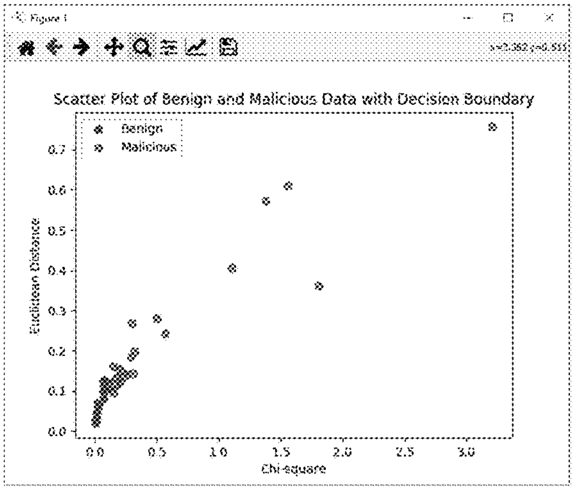
Figure 10B:
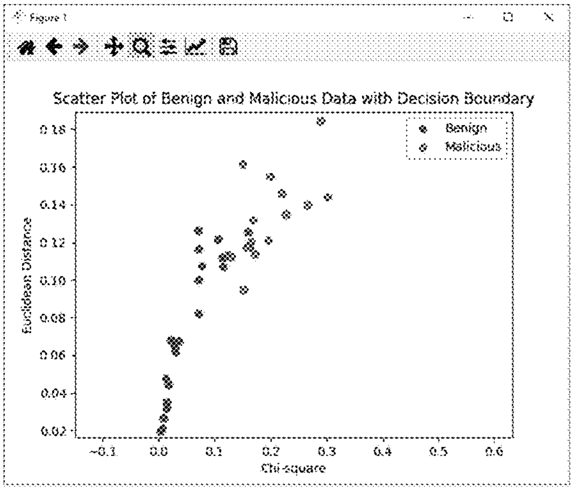

FIG. 10B depicts a magnified view of the clustered area in FIG. 10A.

Figure 11:
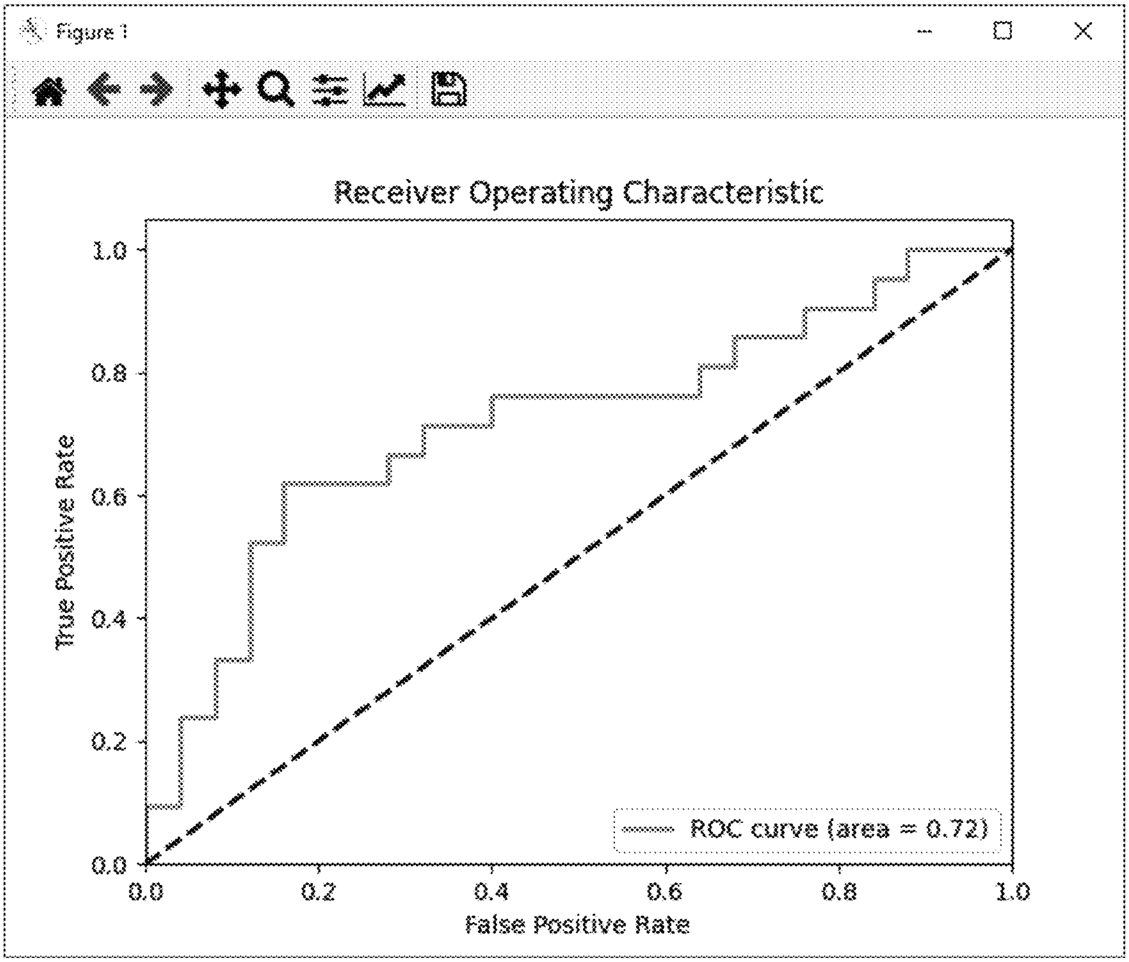

FIG. 11 depicts an ROC curve for a supervised learning model.

Figure 12A:
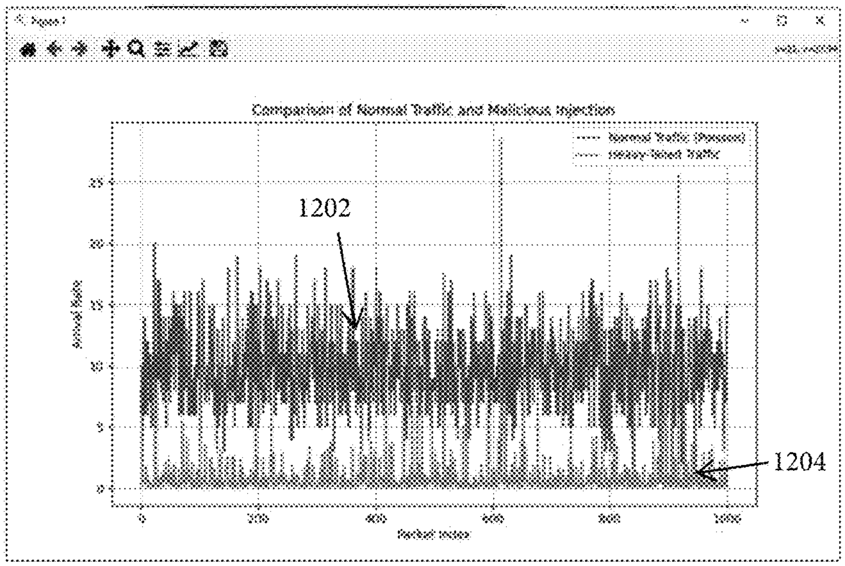

FIG. 12A depicts a comparison of normal traffic and malicious injection.

Figure 12B:
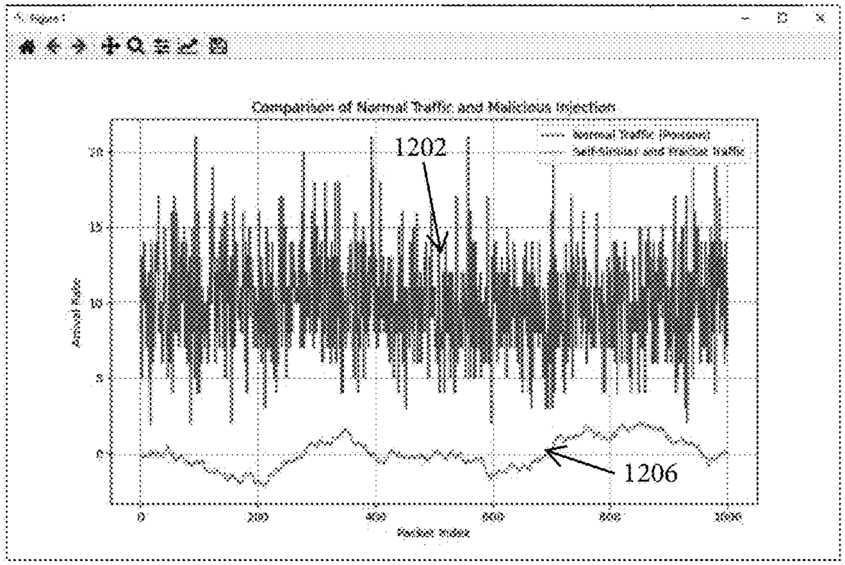

FIG. 12B depicts additional features of a comparison of normal traffic and malicious injection.

Figure 12C:
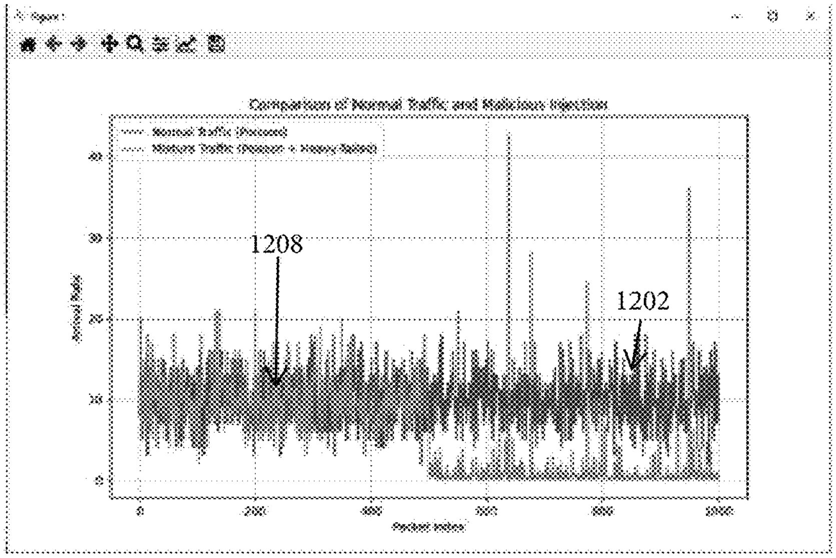

FIG. 12C depicts additional features of a comparison of normal traffic and malicious injection.

Figure 13:
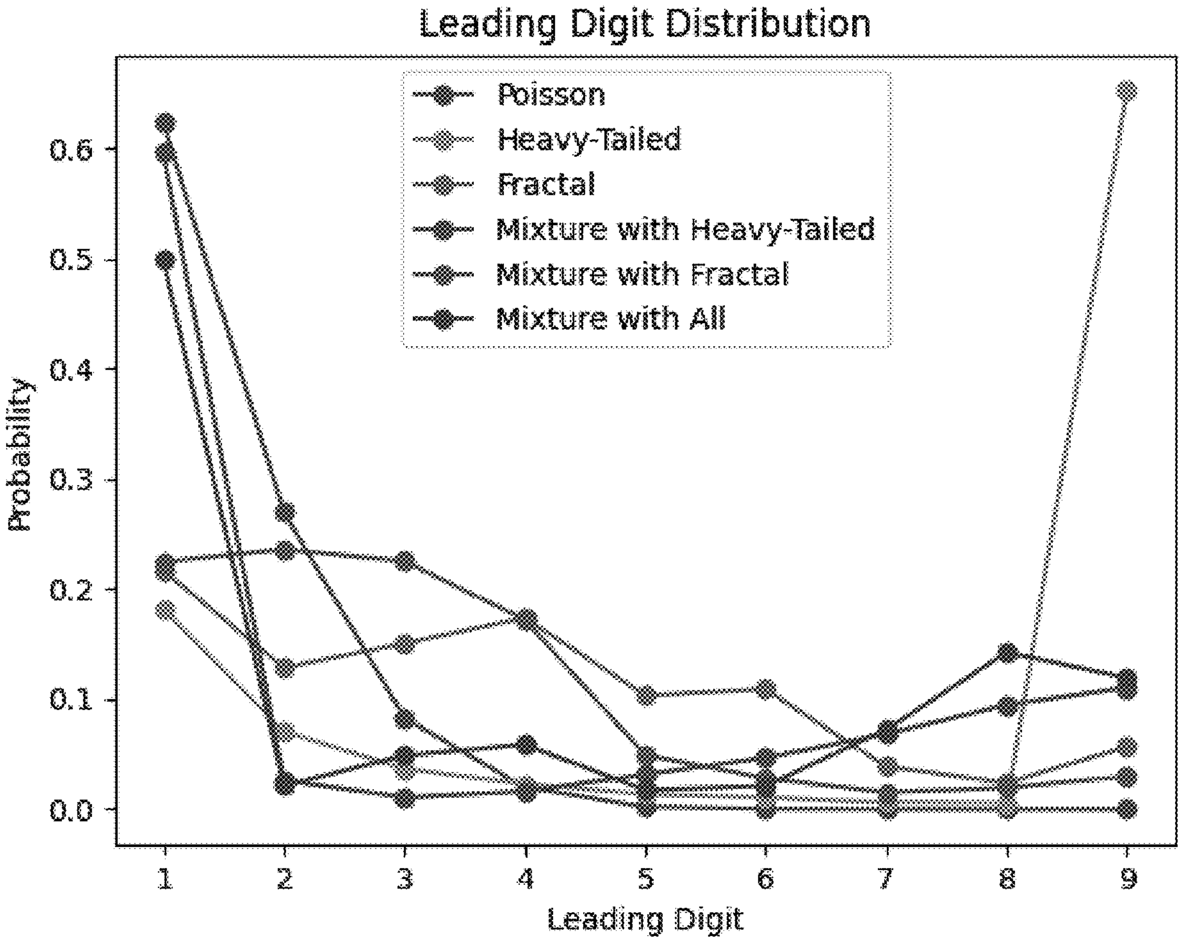

FIG. 13 depicts a leading digit distribution.

Figure 14:
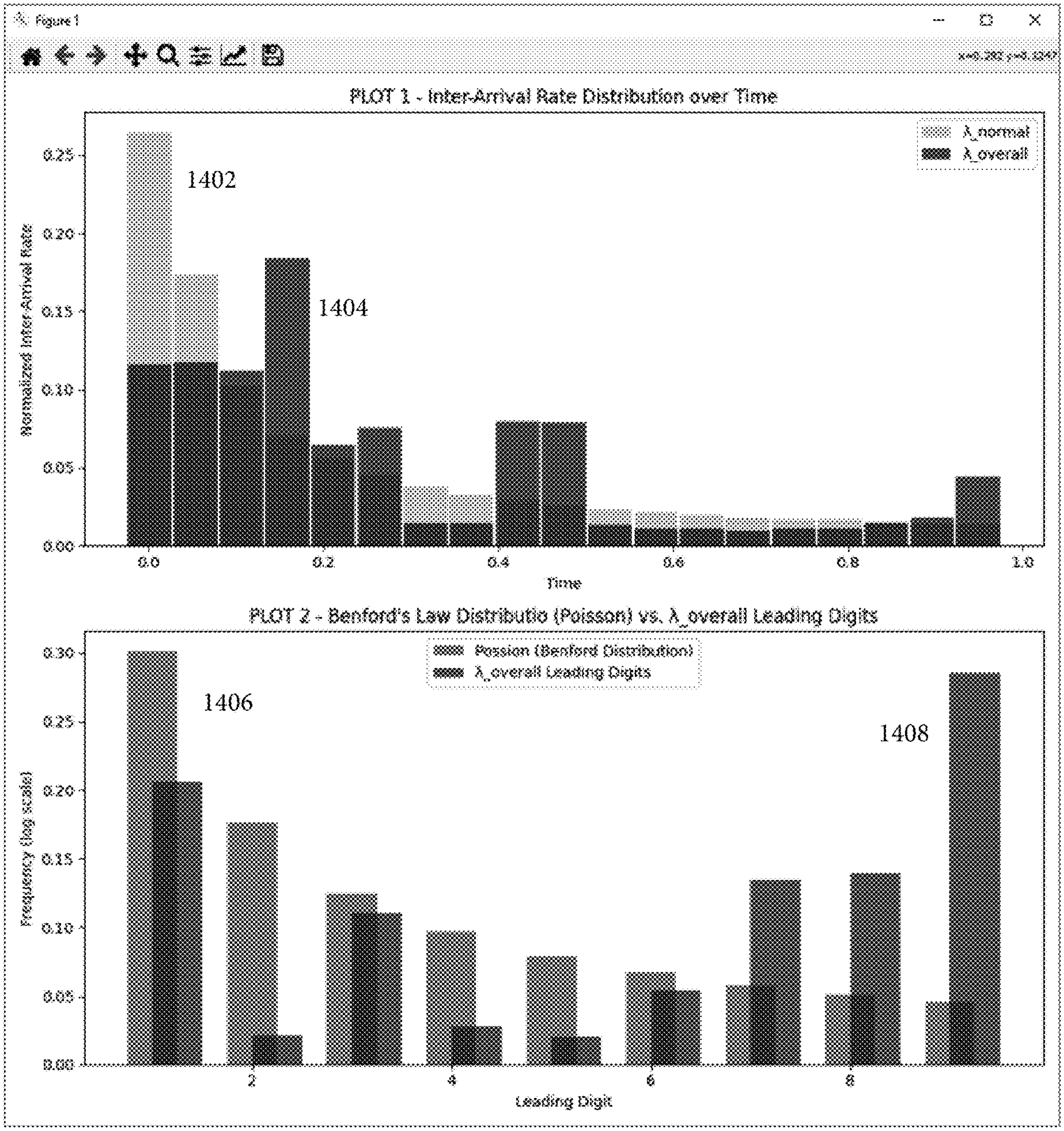

FIG. 14 shows the effect of a malicious inter-arrival rate on the Poisson function.

Figure 15A:
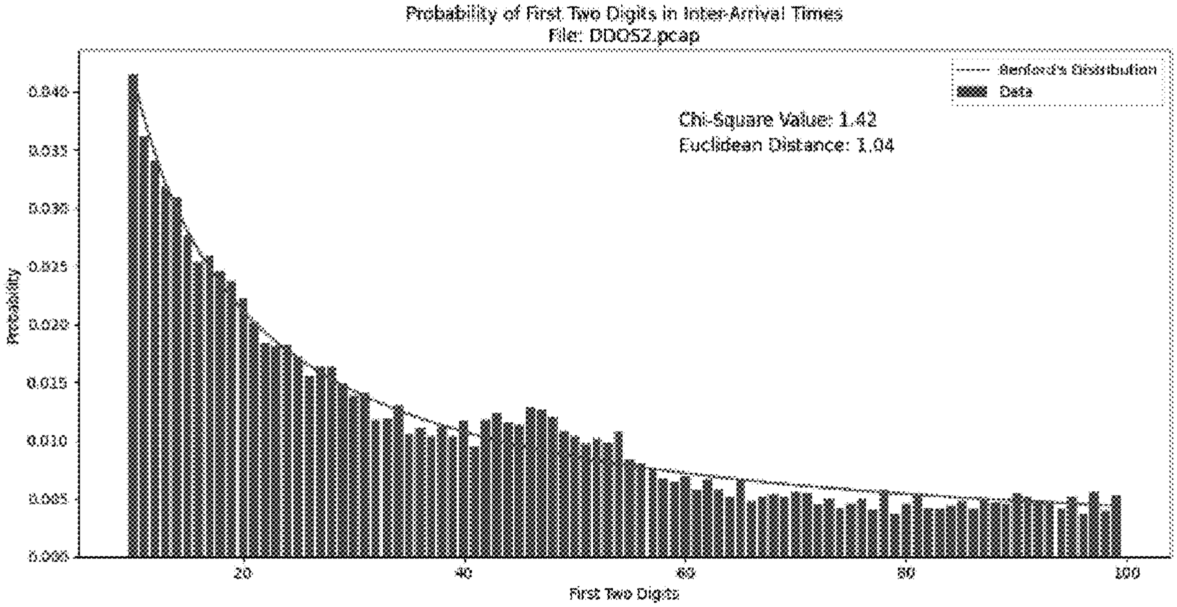

FIG. 15A shows a detailed exploration of the first two digits as the leading digits.

Figure 15B:
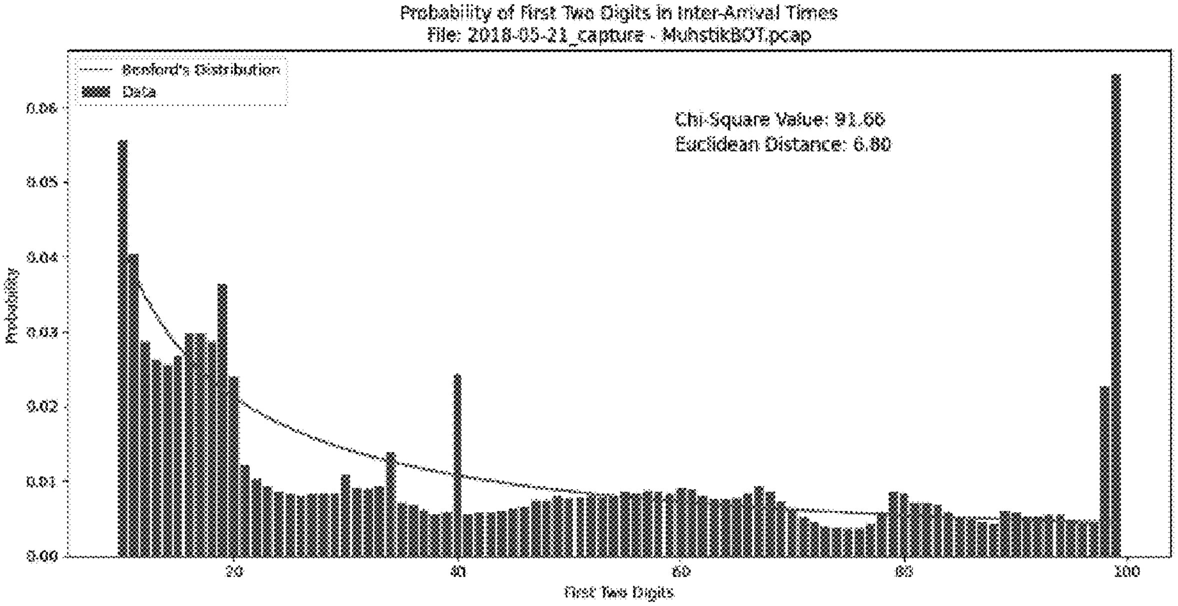

FIG. 15B shows additional features of a detailed exploration of the first two digits as the leading digits.

Figure 16:
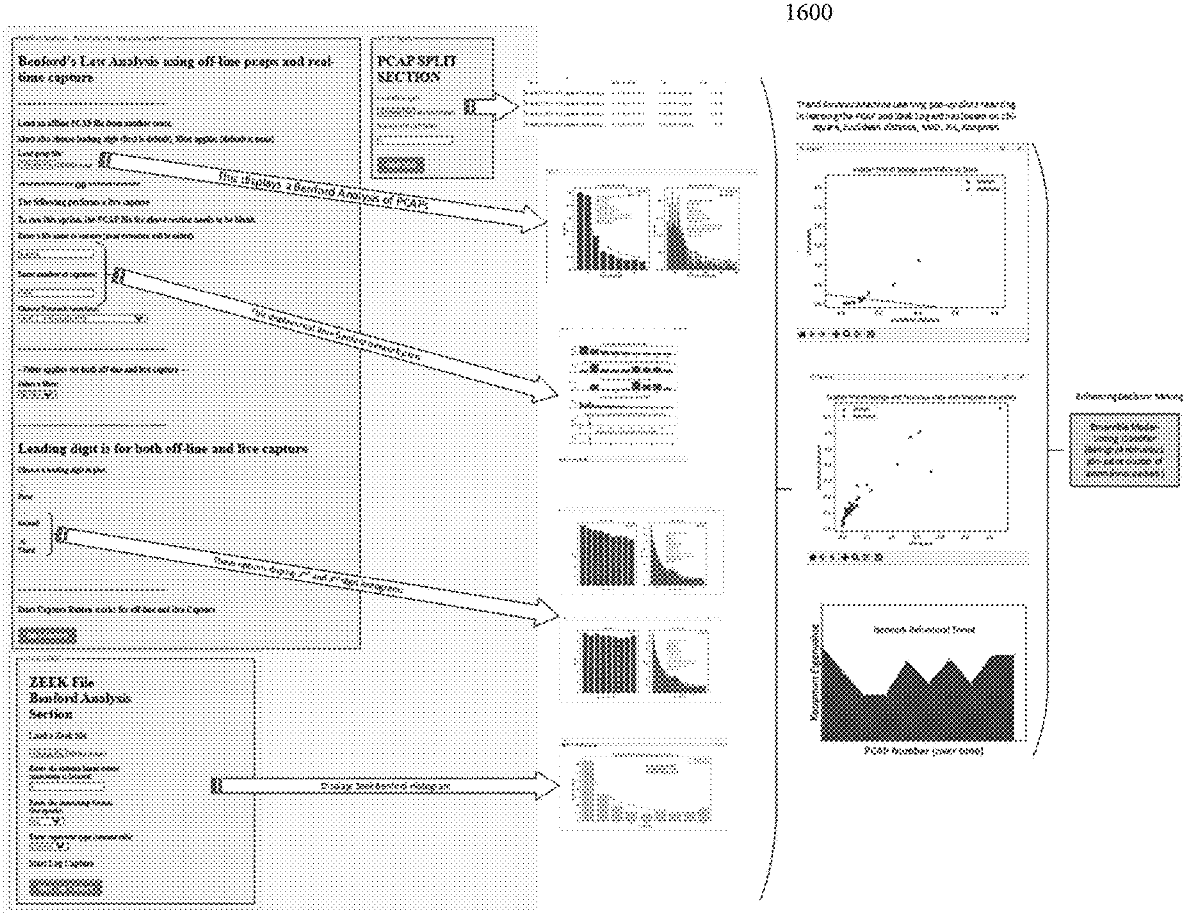

FIG. 16 shows a graphical user interface for implementing one or more of the aspects of the present disclosure.

Figure 17:
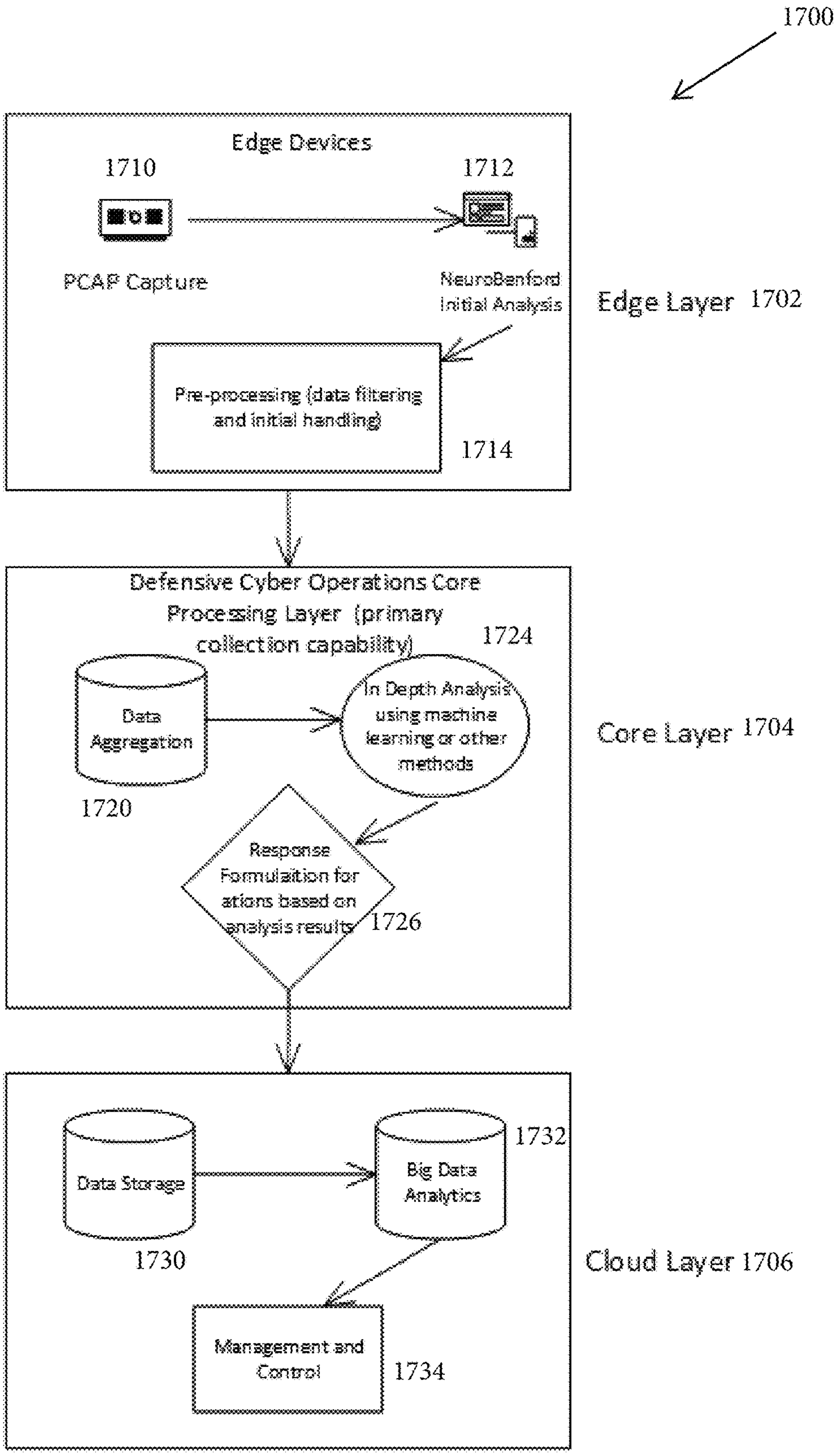

FIG. 17 shows an architecture for implementing one or more of the aspects of the present disclosure.

It should be understood that the appended drawings are not necessarily to scale, presenting a somewhat simplified representation of various features illustrative of the basic principles of the technology. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE TECHNOLOGY

Malicious network traffic can exhibit different characteristics from normal or benign traffic, and this can impact its statistical properties, including Poisson distribution patterns. For example, malicious actors, such as hackers, worms, bots, and malware creators, often manipulate network traffic to achieve their goals. This manipulation can include crafting packets in a way that avoids detection or exploits vulnerabilities. This can lead to deviations from the typical characteristics of benign traffic, including changes in packet size, timing, and payload content. Additionally, malicious software (such as bots and worms) can generate network traffic in ways that are different from normal user behavior. For example, a botnet can coordinate thousands of infected computers to send traffic to a target, creating abnormal patterns that don't align with Poisson distributions. Moreover, malware and other malicious activities often exhibit patterns of behavior that are different from legitimate user activity. This can include rapid, coordinated, or repetitive actions that result in spikes or unusual patterns in network traffic.

Additionally, malicious actors may actively work to evade detection mechanisms, including statistical analysis. They may intentionally introduce noise or randomness to their traffic to confuse intrusion detection systems (IDS) and other security tools. Further, malicious actors may utilize encryption to obscure their actions. As more internet traffic is encrypted, analyzing the content of packets becomes more challenging. While statistical analysis can still be performed on encrypted traffic metadata, the actual payload may not be directly visible.

Additionally, different types of malicious activities, such as Distributed Denial of Service (DDoS) attacks, data exfiltration, and command-and-control (C2) communication, can have distinct characteristics that impact their statistical behavior. Benford's Law, a principle of anomalous behavior, provides insight into the realization that malicious activities often lead to traffic patterns that significantly diverge from those exhibited by benign traffic. These deviations can stem from the factors previously outlined, as well as the deliberate tactics employed by attackers to evade detection.

Traditional methods of intrusion detection involve scrutinizing the contents of every packet received by a network. However, this method becomes challenging when dealing with high volumes of incoming packets or high-speed traffic. Accordingly, alternative approaches, such as flow-based intrusion detection may be required. This methodology can include the analysis of data flows within the network, rather than focusing on the contents of individual packets.

Utilizing Benford's Law for Detection of Intrusions

Benford's Law, also known as the first-digit law, describes the statistical distribution of leading digits in various datasets. According to this law, the first significant digit is more likely to be small than large. Specifically, the probability that the first digit is "d" is given by:

$$P(d) = \log_{10}(1 + 1/d)$$

Figure 1:
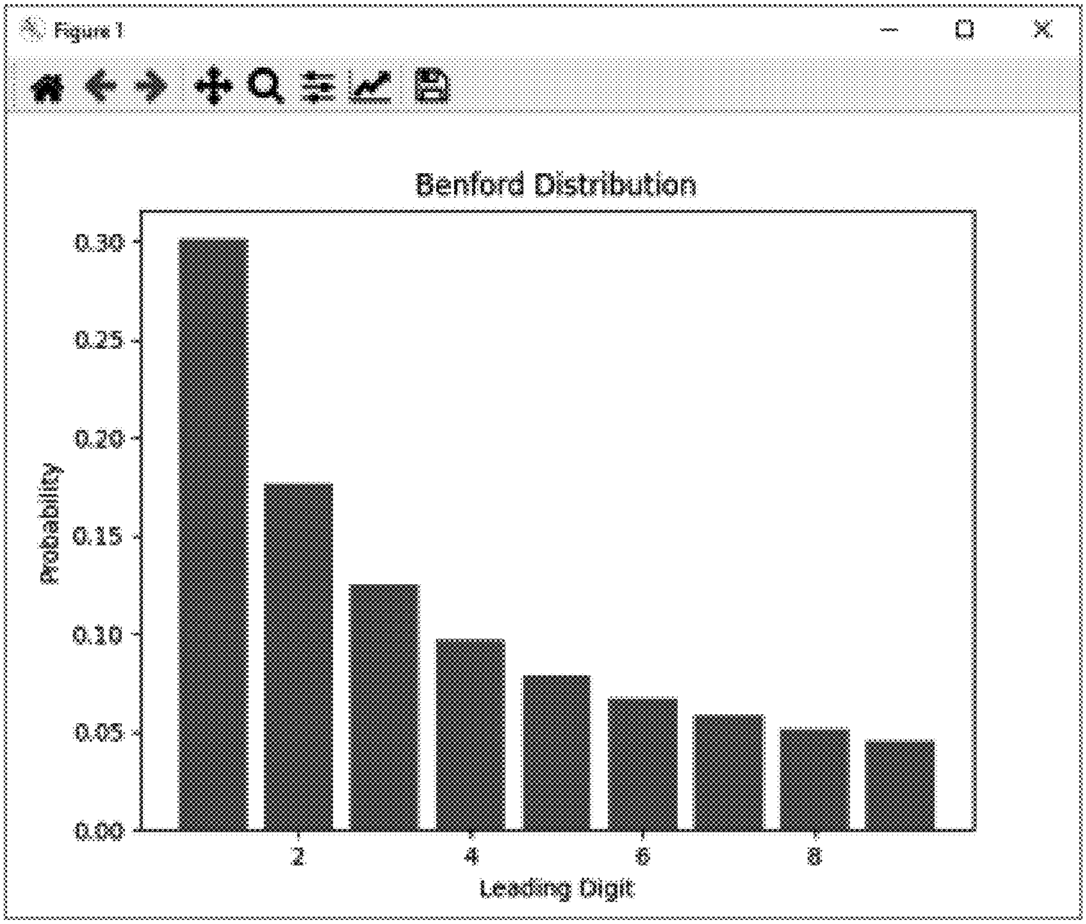
FIG. 1 shows the distribution plot according to Benford's Law.

Hence, the smaller digits (1, 2, 3, . . . ) are more common as leading digits, occurring about 30% of the time than larger digits (8,9), occurring approximately 5% of the time. FIG. 1 shows the distribution plot according to Benford's Law as derived from equation 1. As can be seen, Benford's law follows a logarithmic distribution.

Figure 2A:
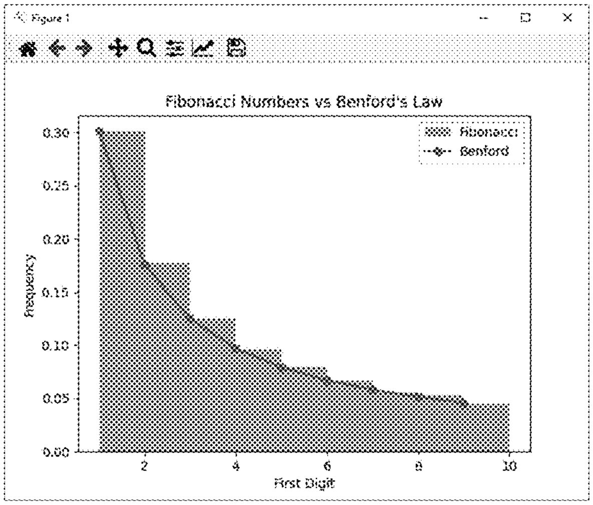
FIG. 2A shows the applicability of Benford's Law to the Fibonacci Series of numbers.
Figure 2B:
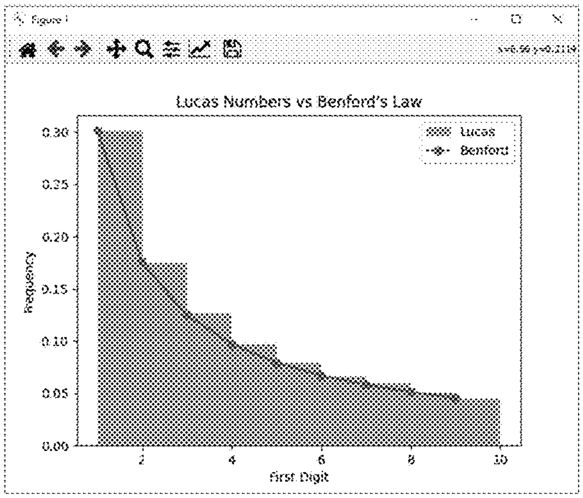
FIG. 2B shows the applicability of Benford's Law to the Lucas numbers.

Benford's Law is applicable to a diverse set of domains, such as finance, population statistics, and scientific data. Notably, the Fibonacci series and Lucas numbers follow Benford's distribution law as shown in FIGS. 2A and 2B. Benford's Law was first discovered by the Canadian-American astronomer Simon Newcomb in 1881 when he observed that earlier pages in logarithm tables, which started with the digit 1, were more worn than others. In 1938, physicist Frank Benford conducted experiments on datasets from diverse domains, thus giving rise to the term "Benford's Law" to describe this phenomenon of anomalous behavior. However, to this point the application of Benford's Law has not been extended to internet traffic analysis for anomaly detection.

Poisson Processes

Figure 3A:
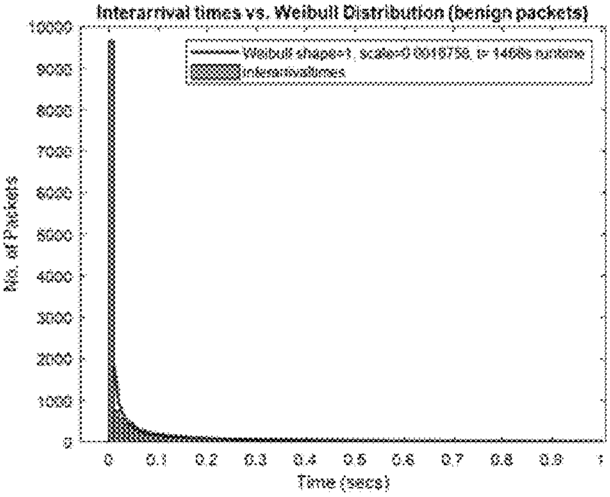
FIG. 3A shows interarrival times v. Weibull distribution for a group of packets.
Figure 3B:
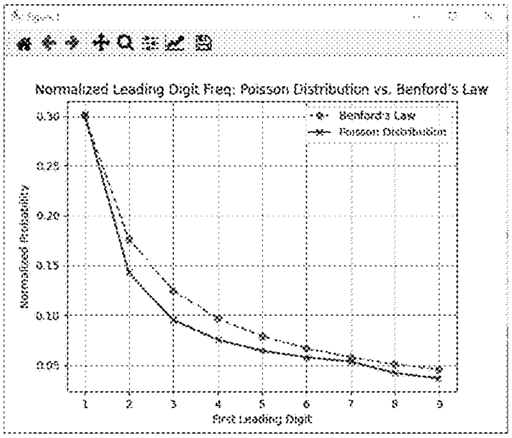
FIG. 3B shows a normalized leading digit frequency.
Figure 4A:
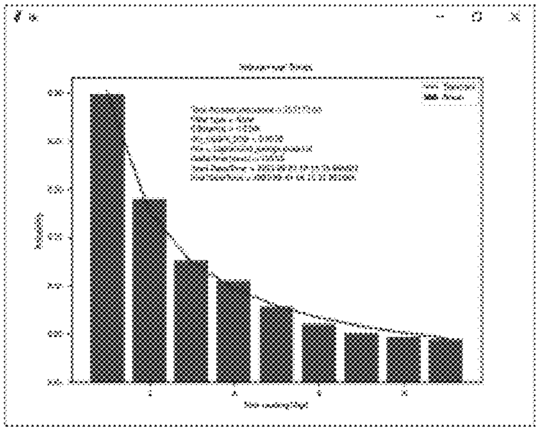
FIG. 4A illustrates one or more examples of benign packet inter-arrival times.
Figure 4B:
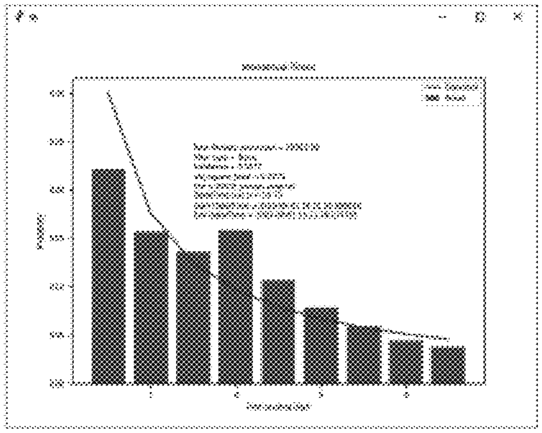
FIG. 4B illustrates one or more examples of benign packet inter-arrival times.
Figure 4C:
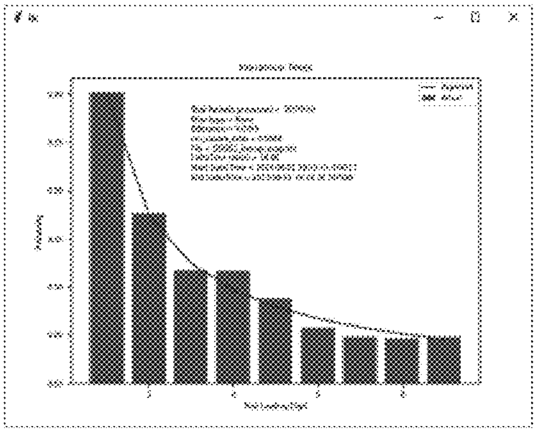
FIG. 4C illustrates one or more examples of benign packet inter-arrival times.
Figure 4D:
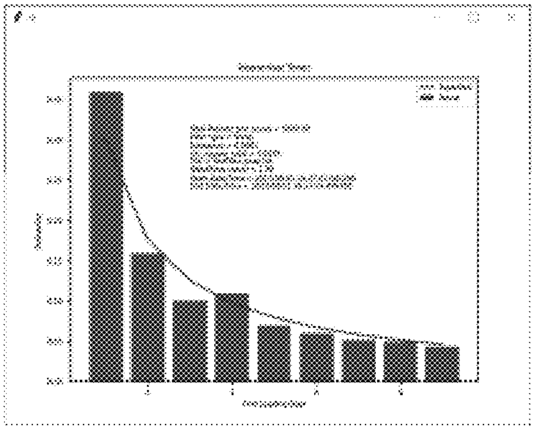
FIG. 4D illustrates one or more examples of benign packet inter-arrival times.
Figure 4E:
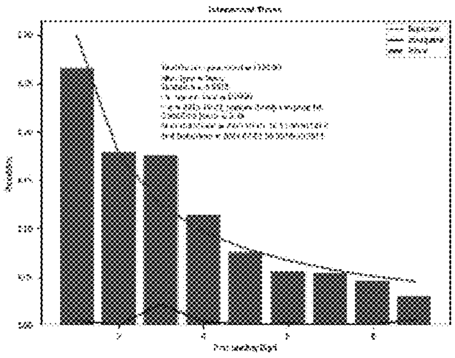
FIG. 4E illustrates one or more examples of benign packet inter-arrival times.
Figure 4F:
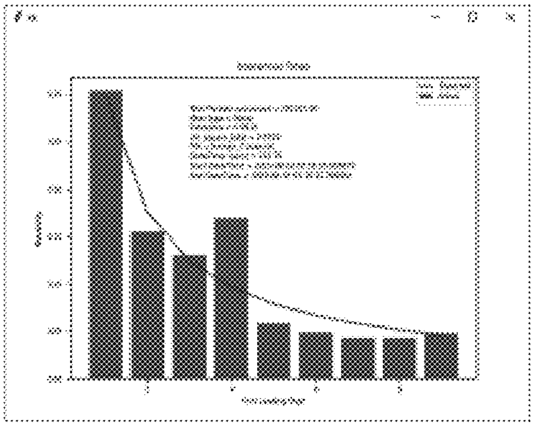
FIG. 4F illustrates one or more examples of benign packet inter-arrival times.

Poisson processes may be a tool for modeling the stochastic patterns of events transpiring at random intervals. In the context of internet traffic analysis, Poisson processes find utility in capturing the behaviors of normal, benign traffic. The inter-arrival times of packet flows (i.e., the time gaps between successive packets arriving at a node) align with a Poisson distribution, as illustrated in FIG. 3A. In the figure, the x-axis depicts inter-arrival times and the y-axis depicts the number of packets arrived. These inter-arrival times, following a Poisson distribution, can also be suitably represented by a Weibull distribution characterized by a shape parameter of one and a scale parameter of k as in FIG. 3A. This representation indicates a logarithmic growth pattern in the distribution of inter-arrival times, analogous to the pattern requisite for Benford's Law. Given the inter-arrival times' conformance to a Poisson distribution as shown in FIG. 3A, it logically follows that the distribution of their first digits should adhere to Benford's Law. Indeed, this is verified, as shown in FIG. 3B. Harnessing Benford's Law, operators can meticulously assess the initial digit distributions of inter-arrival times, effectively spotting any deviations from the expected distribution.

Anomaly Analysis of Leading Digits in Inter-Arrival Times

The analysis presented in Table 1 provides an excerpt from processed packet capture (PCAP) files, where leading digits of inter-arrival times are extracted. The focus of this research is primarily on the first leading digit, which is carefully cataloged and analyzed. The subsequent columns present the second and third leading digits for future research considerations. This analysis, centered on the first leading digit, involves counting the occurrences of each digit and plotting their frequencies against a well-known distribution, Benford's Law.

TABLE 1

Leading Digits Extracted

| First Digit | Second Digit | Third Digit | Arrival Time | Inter-Arrival Time |
|---|---|---|---|---|
| 2 | 3 | 9 | 167918652 4.368840 | 0.239421 |
| 1 | 7 | 9 | 167918652 4.548541 | 0.179701 |
| 2 | 4 | 3 | 167918652 4.791997 | 0.243456 |
| 1 | 8 | 4 | 167918652 4.792181 | 0.000184 |
| 8 | 9 | 0 | 167918652 4.792270 | 0.000089 |

Experimental investigation encompassed the analysis of both PCAP files and Zeek logs, offering granular packet-level data and higher-level network activity insights, respectively. The obtained results underscore the compliance of benign traffic with Benford's distribution, in stark contrast to the discernible deviations observed in malicious traffic. By juxtaposing the observed behavior of malicious traffic against the backdrop of Benford's Law, operators gain a rapid and precise means of identifying anomalies. This expeditious identification equips network systems with the tools to detect, mitigate, and respond to security threats effectively.

While PCAP files offer nuanced timing information, Zeek logs provide a broader view of network activity. Throughout the research, the focus remained on the first leading digit's frequency and probability distribution of PCAP files because PCAP files can be considered the gold standard for network forensics. PCAP, or full packet data capture for analysis captures the entirety of every packet that comprises the network traffic (both metadata and content). If something happens on the network, PCAP may capture data about it. Whether it is malware moving data around, or staff arranging a private party, it can be captured and then analyzed. This approach may facilitate a robust differentiation strategy that highlights the statistical deviations indicative of malicious intent.

Figure 5A:
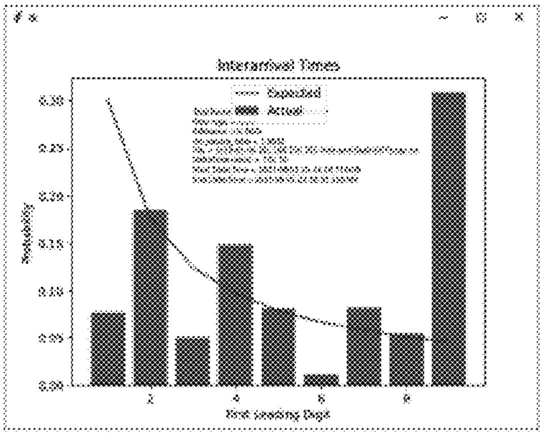
FIG. 5A shows exemplary anomaly detection of various bots and viruses in PCAP files, where the expected Benford distribution does not conform to the actual data distribution.
Figure 5B:
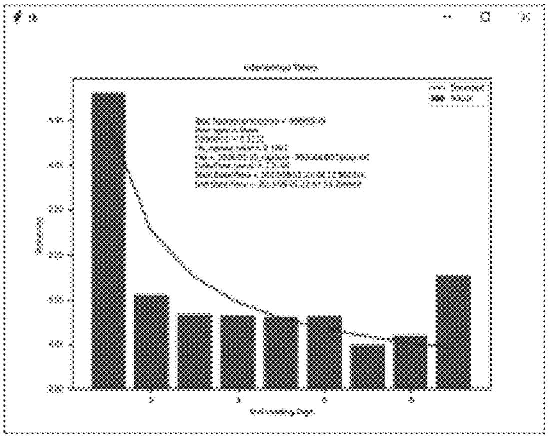
FIG. 5B shows additional exemplary anomaly detection of various bots and viruses in PCAP files, where the expected Benford distribution does not conform to the actual data distribution.
Figure 5C:
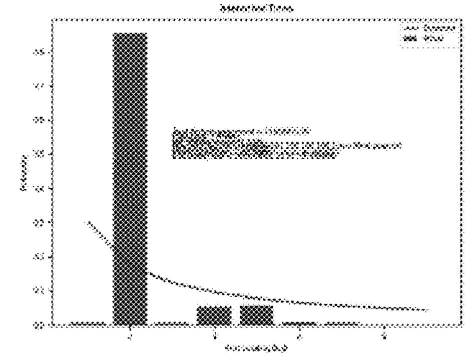
FIG. 5C shows additional exemplary anomaly detection of various bots and viruses in PCAP files, where the expected Benford distribution does not conform to the actual data distribution.
Figure 5D:
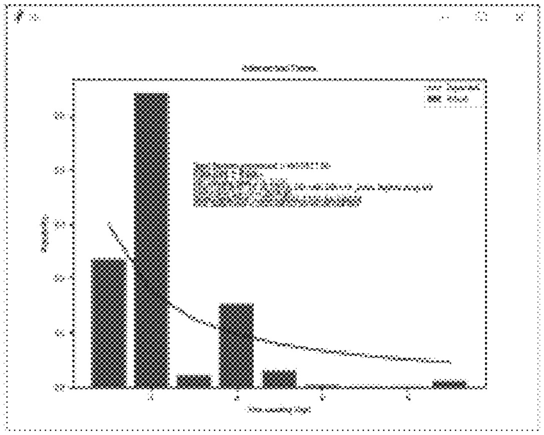
FIG. 5D shows additional exemplary anomaly detection of various bots and viruses in PCAP files, where the expected Benford distribution does not conform to the actual data distribution.
Figure 5E:
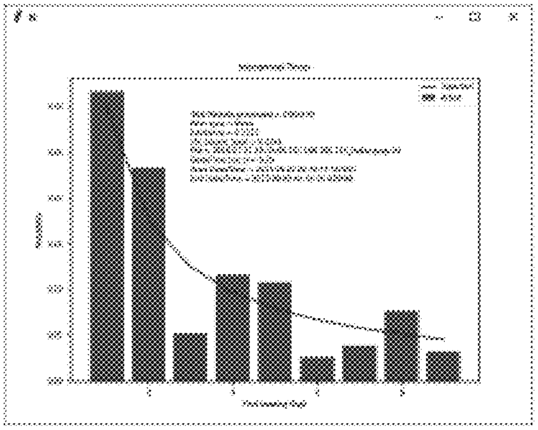
FIG. 5E shows additional exemplary anomaly detection of various bots and viruses in PCAP files, where the expected Benford distribution does not conform to the actual data distribution.
Figure 5F:
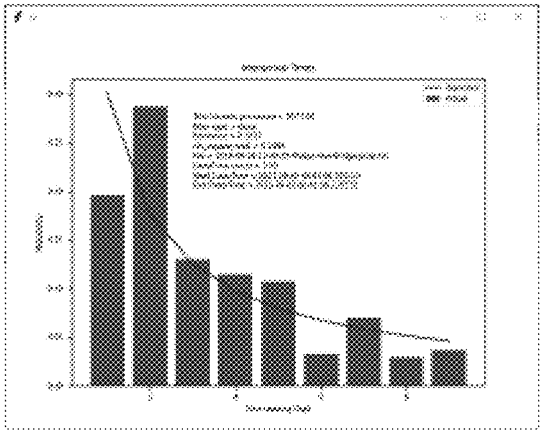
FIG. 5F shows additional exemplary anomaly detection of various bots and viruses in PCAP files, where the expected Benford distribution does not conform to the actual data distribution.
Figure 6A:
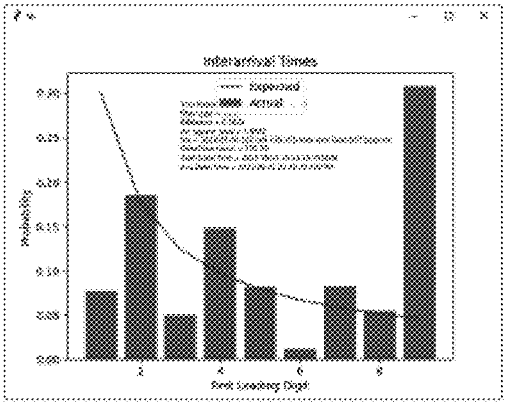
FIG. 6A shows a side-by-side Benford comparison of malicious PCAP files and corresponding Zeek logs.
Figure 6B:
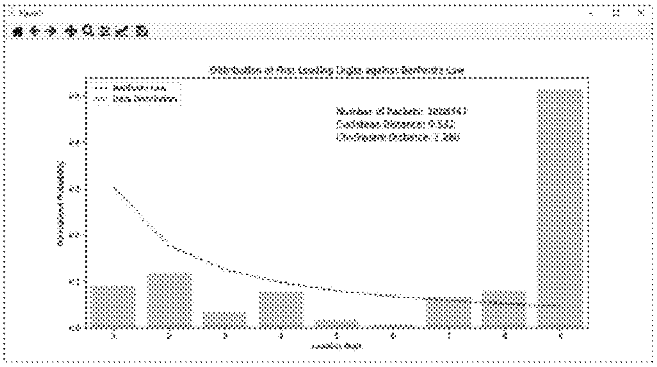
FIG. 6B shows additional features of a side-by-side Benford comparison of malicious PCAP files and corresponding Zeek logs.
Figure 6C:
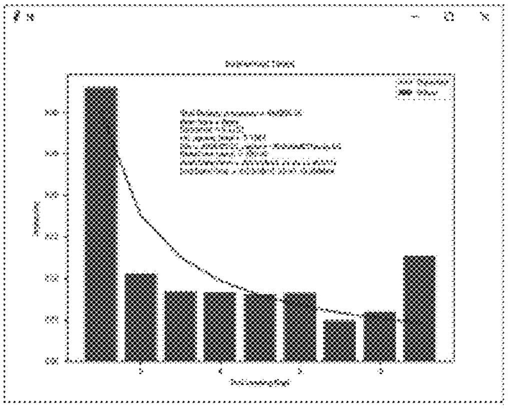
FIG. 6C shows additional features of a side-by-side Benford comparison of malicious PCAP files and corresponding Zeek logs.
Figure 6D:
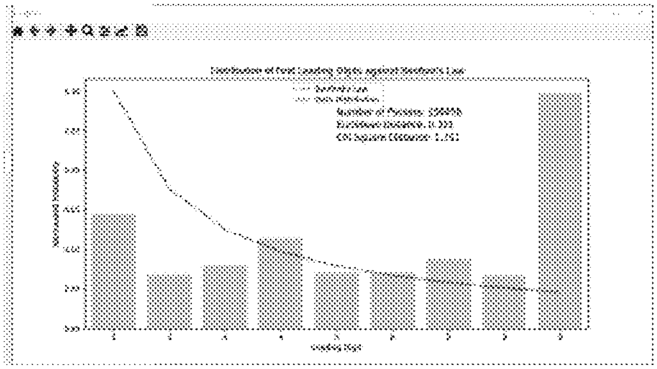
FIG. 6D shows additional features of a side-by-side Benford comparison of malicious PCAP files and corresponding Zeek logs.
Figure 7A:
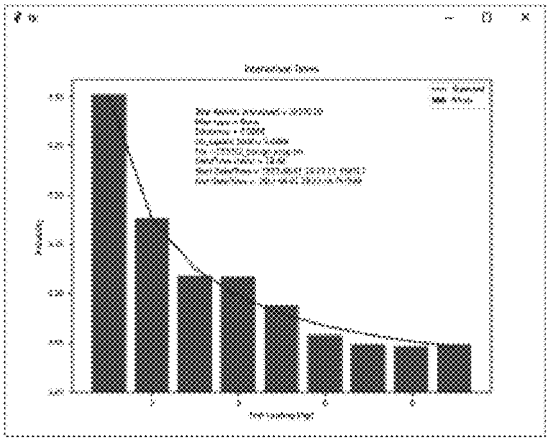
FIG. 7A shows a side-by-side Benford comparison of benign PCAP files and corresponding Zeek logs.
Figure 7B:
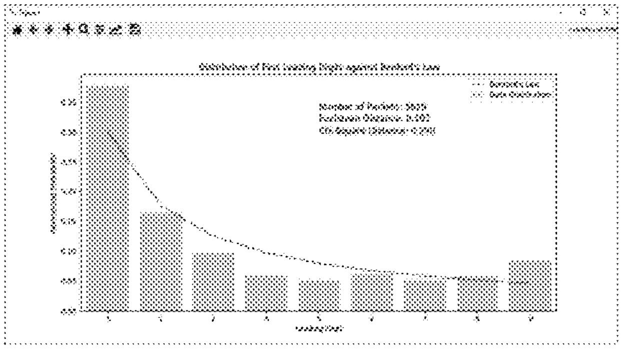
FIG. 7B shows additional features of a side-by-side Benford comparison of benign PCAP files and corresponding Zeek logs.
Figure 7C:
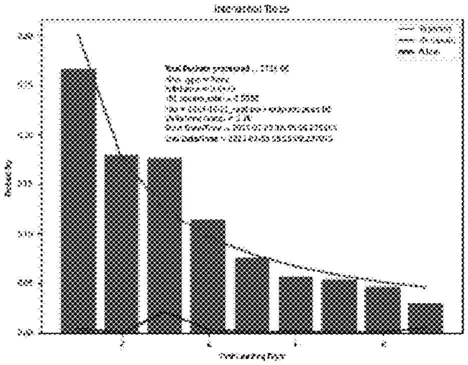
FIG. 7C shows additional features of a side-by-side Benford comparison of benign PCAP files and corresponding Zeek logs.
Figure 7D:
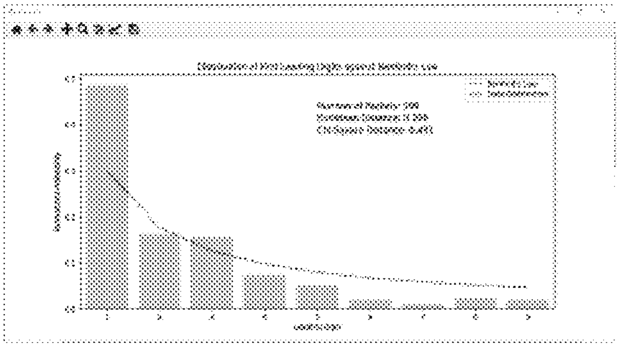
FIG. 7D shows additional features of a side-by-side Benford comparison of benign PCAP files and corresponding Zeek logs.

Through the analysis of PCAP files and Zeek logs, it is observed that benign traffic conforms to the expected Benford distribution, while malicious traffic deviates significantly from this distribution. FIGS. 4A-4F illustrate examples of benign packet inter-arrival times, where the expected Benford distribution (solid line) aligns reasonably well with the data (grey bars). In contrast, FIGS. 5A-5F depict the anomaly detection of various bots and viruses in PCAP files, where the expected Benford distribution (solid line) does not conform to the actual data distribution (grey bars), signaling anomalous activity that requires further investigation. FIG. 5A depicts [Hide and Seek Bot]. FIG. 5B depicts [Mushtik Bot]. FIG. 5C depicts [Linux Mirai Bot]. FIG. 5D depicts [Hajime Virus]. FIG. 5E depicts [Hakai Bot]. FIG. 5F depicts [Philips-Hue-Bridge Virus].

Side-by-side comparisons of malicious and benign traffic between PCAP files and Zeek logs are shown in FIGS. 6A-6D and 7A-7D, respectively. The data used to present the plots were collected from various sources for collecting benign and malware captures.

While certain instances in this data set for benign traffic may not exhibit flawless alignment to Benford's law, it is important to recognize that through training, an operator can discern the distinctions between benign and malicious traffic—a skill akin to that applied in the realm of financial fraud detection using Benford's Law. The subsequent discussion on feature extraction serves to further amplify the perceptibility of these distinctions.

Experimental findings may demonstrate the potential utility of Benford's Law in detecting anomalous behavior in real-world network traffic, enhancing the ability to identify potential security threats rapidly. The integration of Benford's Law and Poisson processes optimizes cyberspace security and defense environments. Also, such integration may streamline workloads associated with real-time packet analysis. As thousands of incoming packets are processed sequentially, Benford's Law efficiently assesses each PCAP for potential malicious intent. This approach eliminates the need to devote extensive time to each individual PCAP, swiftly categorizing them as benign or warranting further scrutiny. Consequently, the workload reduction achieved by this integration accelerates the detection and response to potential security threats, enhancing the overall efficiency and effectiveness of network defense.

Differentiating Benign and Malicious Traffic Using Supervised and Unsupervised Learning Table 2 presents a dataset sample used for this work, derived from the Benford analysis, comprising a total of 92 data points. This dataset size is deemed sufficient for the feasibility study, offering a representative sample for analysis. Crucial attributes, notably chi-square and Euclidean distance, assume significant roles within both supervised and unsupervised learning paradigms. Although analogous to the sum squares deviation (SSD) employed by others, the authors opted for the nomenclature Euclidean distance over SSD to better encapsulate its nature. These attributes function as discriminative indicators, pivotal in the classification of benign and malicious traffic patterns.

TABLE 2

Anomaly Detection Attributes and Classification Data Sets

| No. | File Name | Total Packets | Filter Type | Run-Time (sec) | Chisquare | EDistance | Malicious (M)/Benign (B) |
|---|---|---|---|---|---|---|---|
| 1 | 2023-03-07-home.pcap.txt | 1488 | None | 0.616187811 | 0.105386696 | 0.121771671 | B |
| 2 | capture 2v2 benign.pcap.txt | 217171 | None | 101.8445392 | 0.003804267 | 0.019820283 | B |
| 3 | 2018-05-21__capture - MuhstikBOT.pcap.txt | 496959 | None | 220.8516223 | 0.196291247 | 0.121165156 | M |
| 4 | 2018-05-09-192.168.100.103-Hide-and-Seek-BOT.pcap.txt | 1686291 | None | 783.4477441 | 1.804205317 | 0.362248549 | M |
| 5 | malware.pcap.txt | 182266 | None | 137.5849581 | 0.316418817 | 0.197627816 | M |
| 6 | phishing.pcap.txt | 95492 | None | 63.389734575 | 0.498491328 | 0.278314975 | M |
| 7 | spam.pcap.txt | 61046 | None | 36.33115816 | 0.288942172 | 0.184236498 | M |
| 8 | testFile3.pcap.txt | 50000 | None | 22.58757162 | 0.02882924 | 0.064453021 | B |
| 9 | 2018-07-20-17-31-20-192.168.100.108__Linux.Mirai.pcap.txt | 11508430 | None | 5393.434994 | 3.208464386 | 0.755337567 | M |
| 10 | 2018-07-31-15-15-09-192.168.100.113__Hakai.pcap.txt malicious | 23623 | None | 9.129928589 | 0.123411424 | 0.113191274 | M |
| 11 | botnet-capture-20110810-neris.pcap.txt malicious | 323154 | None | 158.8879611 | 0.151518555 | 0.095051236 | M |
| 12 | 2023-02-Unit42-Wireshark-quiz.pcap.txt benign | 55207 | None | 25.1010921 | 0.071891955 | 0.116405274 | B |
| 13 | DDOS benign.pcap.txt | 29383 | None | 14.02100205 | 0.077162312 | 0.107667072 | B |
| 14 | DDOS2 benign.pcap.txt | 30570 | None | 16.72265792 | 0.008807459 | 0.02677641 | B |
| 15 | 2018-09-14-13-40-25-Philips-Hue-Bridge.pcap.txt malicious | 8573 | None | 4.238648653 | 0.149765918 | 0.161668477 | M |

TABLE 2-continued

| Anomaly Detection Attributes and Classification Data Sets | | | | | | | |
|---|---|---|---|---|---|---|---|
| No. | File Name | Total Packets | Filter Type | Run-Time (sec) | Chisquare | EDistance | Malicious (M)/Benign (B) |
| 16 | testfile2.pcap.txt normal | 5000 | None | 2.1010921 | 0.0225 | 0.0681 | B |
| 17 | 2018-07-25-10-53-linux-hajime.pcap.txt malicious | 6437837 | None | 0.661450624 | 1.111 | 0.407 | M |
| 18 | 2015-3-24_capture1-only-dns-peap.txt.malicious | 5966 | None | 1.021002054 | 0.296 | 0.267 | M |
| 19 | 2013-10-21_capture--1-only dns.pcap.txt normal | 1720 | None | 1.722657919 | 0.0361 | 0.0675 | B |
| 20 | 2017-07-03_capture-win2.pcap.txt normal | 949 | None | 0.105157876 | 0.0718 | 0.1264 | B |

The chi-square feature quantifies the disparity between expected and observed data distributions, while the Euclidean distance assesses the overall divergence between these distributions. The Euclidean distance measurement encompasses the logarithmic separation between the distributions.

Chi-square is formulated as follows:

\

$$\chi^2 = \sum\left[(observedfrequency - expectedfrequency)^2/\text{expected frequency}\right]$$

Here, the summation ranges from the lowest feasible digit to its maximum. In the realm of chi-square, deviation from conventional employment occurs due to its inapplicability to the underlying data of this article. Traditional application of chi-square tests is unsuitable for this dataset, and its misuse in mathematical and empirical research has led to misguided inferences and confusion.

Euclidean Distance is defined as:

$$ED = \sqrt{\left(\sum(\text{observed} - \text{expected})^2\right)}$$

In this formula, ED represents the Euclidean distance, and the summation encompasses digits from the lowest to the highest. Specifically, it quantifies the disparity from the actual/observed digital proportions of any dataset to the ideal Benford's digital proportion-a measure of deviation from the logarithmic expectation.

Figure 8A:
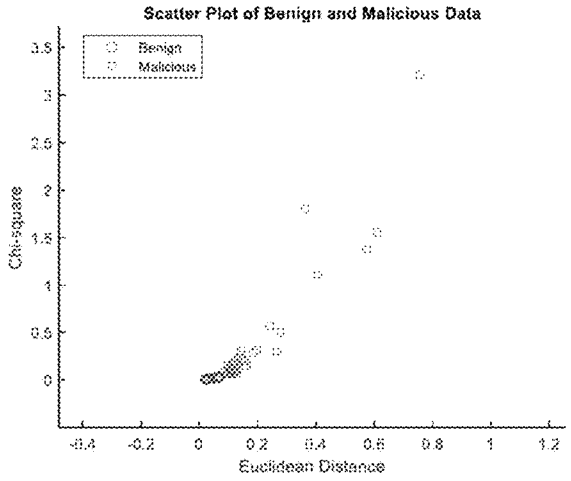
FIG. 8A shows the relationship between Euclidean distance and chi-square values.

By generating a scatter plot (FIG. 8A) showcasing the relationship between Euclidean distance and chi-square values, insight into the data distribution can be gained. Upon closer examination, a distinctive separation between benign and malicious data points emerges in the clustered region. The presence of an outlier is to be expected. Anticipated occurrences of false positives and false negatives underscore the potential of a machine learning model to aid in distinguishing between benign and malicious traffic.

Figure 8B:
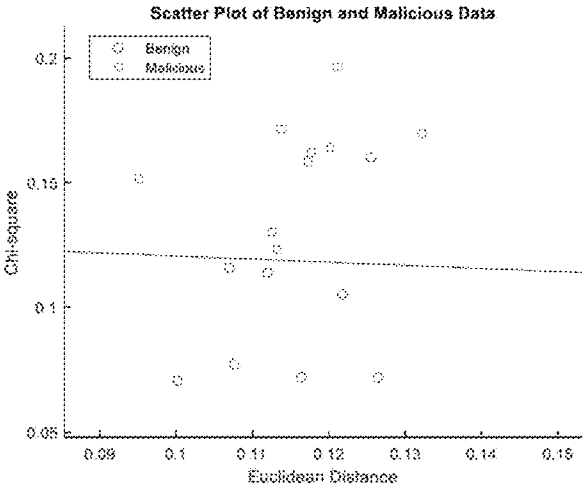
FIG. 8B shows a decision line based on the relationship shown in FIG. 8A.

Furthermore, as depicted in FIG. 8B, a discerning decision line could be drawn, effectively demarcating the boundary between benign and malicious traffic. These delineations provide valuable inputs for the integration of deep learning models, thereby augmenting the detection system's capacity to discern between normal network activity and potentially harmful counterparts.

To further enhance the capabilities of anomaly detection, the framework integrates deep learning models, a discussion of which is presented in the subsequent section. By extracting pertinent features, including chi-square and Euclidean distance, from the application of Benford's Law to inter-arrival times within PCAP files, both supervised and unsupervised learning models can be cultivated to discern between benign and malicious traffic patterns.

The supervised learning model effectively uses a labeled dataset, encompassing benign and malicious traffic instances for training purposes. Conversely, the unsupervised learning model is trained on an unlabeled dataset, relying solely on distinctive features harnessed through the application of Benford's Law to pinpoint patterns and anomalies.

Deep Learning for Anomaly Detection

By extracting features derived from Benford's Law, such as chi-square and Euclidean distance, supervised and unsupervised learning models are trained to differentiate between benign and malicious traffic patterns.

Figure 9A:
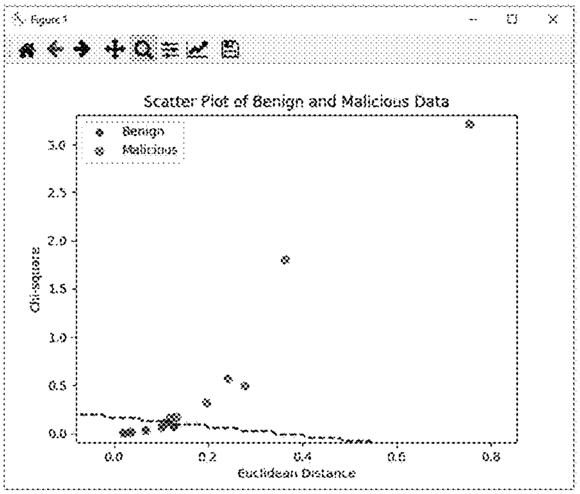
FIG. 9A shows the results of supervised learning.
Figure 9B:
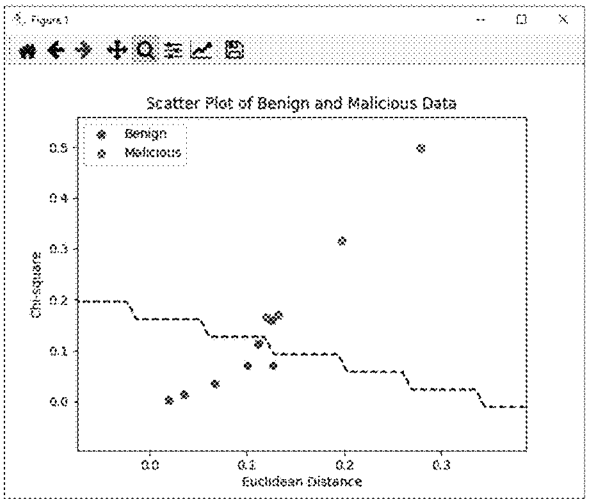
FIG. 9B depicts a magnified view of the clustered area in FIG. 9A.

FIG. 9A depicts the results of supervised learning (the model automatically drawing the separation line) and to right is a magnified view of the clustered area, showing the details of the area. In some embodiments, the supervised learning model can use Python's multi-layer Perceptron with two hidden layers, each containing 20 neurons. It utilizes Backpropagation for training and Softmax as the output function. The supervised model achieved a 93% accuracy in drawing a decision line that separated the benign values of chi-square and Euclidean distance from the malicious values. However, due to the inherent complexities of real-world data, some degree of overlap between benign and malicious data points is expected. This overlap, although minimized, is illustrated in the magnified area of FIG. 9B, serving as a reminder of the practical limitations of any model. However, due to the inherent complexities of real-world data, some degree of overlap between benign and malicious data points is expected.

In contrast, the unsupervised learning model, as illustrated in FIG. TOA and its corresponding magnified version (FIG. 10B) showcasing the detailed clustering area, does not achieve the same level of accuracy as its supervised counterpart. As is evident from FIG. 10B, there is noticeable overlap between malicious and benign data points. This observation underscores the need for additional features, particularly for enhancing the performance of the unsupervised model. Python's PyTorch framework, coupled with Tensorflow, for an unsupervised learning approach have been used.

The incorporation of deep learning models significantly augments the anomaly detection capabilities of the system, capitalizing on the feature extraction from Benford's Law. The integration of both supervised and unsupervised learning models strives to delineate between benign and malicious traffic patterns. The supervised model, characterized by its multi-layer perceptron architecture, is better in classification tasks by effectively delineating the decision boundary. Conversely, the unsupervised model, although showcasing promise, struggles with some classification overlap. This stark difference underscores the enhanced efficacy of the supervised model within the contextual scope of this study.

The receiver operating characteristic (ROC) curve is a fundamental tool for assessing the performance of binary classification models. It provides a graphical representation of the relationship between the true positive rate and the false positive rate at various classification thresholds. This curve offers valuable insights into the model's ability to discriminate between positive and negative instances. In this context, the ROC curve is dissected as follows:

True positive rate (sensitivity): This is the ratio of correctly predicted positive instances (true positives) to the total number of actual positive instances. It measures how well the model identifies positive cases.

$$truepositiverate(\text{sensitivity}) = TP/(TP+FN)$$

False positive rate: This is the ratio of incorrectly predicted positive instances (false positives) to the total number of actual negative instances. It measures the fraction of negative cases that are incorrectly classified as positive.

$$falsepositiverate = FP/(FP+TN)$$

In the equations above, the abbreviations are as follows: TP: true positives (correctly predicted positive instances), FN: false negatives (actual positive instances incorrectly predicted as negative), FP: false positives (actual negative instances incorrectly predicted as positive), TN: true negatives (correctly predicted negative instances).

The insights derived from the ROC curve (depicted in FIG. 11) unravel crucial performance aspects of the supervised classification model of FIG. 9A:

The ROC curve's trajectory unveils the interplay between the true positive rate and false positive rate across various classification thresholds. A ROC curve that closely adheres to the top-left corner signifies a superior classifier. This positioning indicates that the model can achieve high true positive rate values while maintaining a low false positive rate, thereby delivering more accurate predictions. The area under the curve (AUC) encapsulates the holistic performance of the classifier. A perfect classifier would exhibit an AUC of 1.0 while a completely random classifier would yield an AUC of 0.5. The proximity of the AUC value to 1.0 directly correlates with the model's prowess in discriminating between positive and negative instances. The AUC acts as a quantitative metric to evaluate the overall quality of the classifier's predictions. The diagonal line that traverses from the bottom-left to the top-right corner of the graph represents the ROC curve of a random classifier. For a classification model to be considered effective, its ROC curve should be situated above this random reference line. A classifier that operates below this line possesses no discriminatory ability and performs on par with randomness.

The ROC curve is created by plotting the true positive rate (sensitivity) on the y-axis against the false positive rate on the x-axis as shown in FIG. 11. Each point on the curve corresponds to a different threshold used for classifying instances. By examining the ROC curve and the AUC value from FIG. 11, it may be assessed how well the classifier in FIG. 9A is performing. As discussed, if the AUC is significantly greater than 0.5 and the curve is higher than the random classifier's line, the model is providing meaningful predictions. As seen from the plot, the curve is higher than the classifiers line, and the AUC's area is 0.72, which is greater than 0.5. It may be ascertained that the classifier is performing well and giving meaningful results. The results demonstrate the potential of deep learning algorithms in accurately classifying benign and malicious network traffic based on the features derived from Benford's analysis, namely chi-square and Euclidean distance. This approach significantly improves the efficiency of anomaly detection, reducing the burden on operators and enabling swift identification and mitigation of potential security threats.

Analyzing Distinct Characteristics of Malicious Network Traffic Through Queue Models In addition to modeling normal traffic with Poisson processes, various models have been introduced to capture the distinct characteristics exhibited by malicious network traffic. Malicious traffic often displays unique patterns and behaviors that significantly differ from the norms of regular network activity. This study undertakes a succinct exploration into modeling and simulation using the potential of Benford's Law as a tool for distinguishing between benign and malicious network traffic. At the heart of this research lies queuing theory, a mathematical discipline that provides frameworks for understanding the behavior of queues—virtual waiting lines—and the processes governing how entities join these queues and are served. In the context of this investigation, queuing theory's principles are harnessed to illustrate the consequences of introducing malicious traffic on the inherent rhythm of inter-arrival intervals—the time gaps between successive data packets arriving at a network node. The introduction of malicious traffic disrupts the natural flow of arrivals, leading to alterations in the distribution of inter-arrival intervals—the time spans between successive arrivals. This research adeptly showcases how queuing theory models, specifically the M/M/1 and M/G/1 queues, can be employed to analyze the ramifications of injecting malicious traffic into a network.

This work used two models:

1. M/M/1 queue: In this model, M represents the exponential distribution of inter-arrival times (the times between consecutive arrivals), and 1 denotes a single server that processes the incoming tasks. This simple yet illustrative model helps us understand how the introduction of malicious traffic, with its irregularities, can impact the server's efficiency and the queue's behavior.
2. M/G/1 queue: Here, M still stands for the exponential distribution of inter-arrival times, while G signifies a general distribution for the service times, which is a more realistic depiction of how tasks are processed in real-world scenarios. This model allows us to explore how malicious traffic, which might have diverse processing requirements compared to normal traffic, affects the network's performance.

In essence, by employing these queuing theory models, the work provides valuable insights into how malicious traffic's introduction can disrupt the expected patterns of network behavior. This analytical approach enhances our understanding of the intricate interplay between the injection of malicious traffic and the subsequent alterations in inter-arrival time distributions—the very heartbeat of network operations.

Traffic Model Illustration and Analysis

The foundational concepts of M/M/1 and M/G/1 queues provide a valuable transition point when delving into various traffic models. These queuing models, grounded in queuing theory, offer insights into the flow of data packets within network systems, which is relevant to both benign and malicious traffic scenarios. The M/M/1 queue represents a scenario where data arrivals adhere to an exponential distribution and are processed by a single server. This setup mirrors the orderly and efficient nature of normal network traffic under optimal conditions. Conversely, the M/G/1 queue introduces a more realistic aspect by considering service times that deviate from the ideal exponential distribution. This mirrors the complex nature of real-world network processing consisting of benign and malicious traffic. A Python program using the appropriate mathematical functions has been developed and serves as an application of these queuing concepts to different traffic models. The generated traffic patterns reflect various aspects of network behavior. The normal traffic pattern aligns with the principles of the M/M/1 queue, where inter-arrival times follow an exponential distribution. Moving forward, the program simulates heavy-tailed traffic, like the M/G/1 queue, accounting for deviations from the exponential distribution, characteristic of real-world scenarios of anomalous traffic. The program also generates self-similar and fractal traffic, capturing the intricate nature of network data flow of anomalous traffic as well. These traffic models echo the M/G/1 queue's consideration of non-uniform service times, highlighting the complexity of self-similarity and fractality in network dynamics.

The program's ability to generate and visualize different traffic models empowers users to discern the interplay between normal and malicious traffic. Through visual comparisons of different patterns, it becomes possible to differentiate between benign network activity and the presence of malicious data. The relationship between M/M/1 and M/G/1 queues and the diverse traffic models presented in the program showcases a bridge between theoretical concepts and practical insights. By tracing the journey from queuing models to traffic patterns, this work contributes to the broader understanding of network behavior and lays the groundwork for advanced anomaly detection techniques. This connection between queuing theory and traffic models offers a comprehensive perspective that can enhance network security strategies and inform decision-making processes.

Top of Form

The findings are presented in FIG. 12, which effectively distinguishes between regular traffic 1202 and malicious traffic 1204. The x-axis, representing the sequential packet numbering or order in the generated traffic, displays the rate variations across the packets. FIG. 12A shows heavy-tailed distributions. This plot compares normal traffic 1202 (Poisson distribution) with heavy-tailed traffic 1204 (Pareto distribution). It shows the differences in arrival rate patterns between these two types of traffic. It illustrates the divergence in arrival rate patterns between two distinctive traffic breeds. FIG. 12B shows self-similar and fractal models. This plot compares normal traffic 1202 (Poisson distribution) with self-similar and fractal traffic generated using fractional Gaussian noise 1206. FIG. 12B visualizes the contrasting characteristics of these two traffic patterns. FIG. 12C shows mixture models. This plot compares normal traffic 1202 (Poisson distribution) with a mixture of normal and heavy-tailed traffic 1208. FIG. 12C demonstrates how combining different traffic types affects the overall arrival rate pattern. The program provides a visual way to understand and compare the behaviors of different types of network traffic.

Analysis: Benford's Law and Traffic Model Variation

In FIG. 13, a compelling exploration unfolds with scrutinization of the distribution of leading digits across different traffic models. The guiding principle here is Benford's Law, which asserts that the frequency distribution of the leading digits in various datasets should follow a specific pattern. Specifically, smaller digits like 1, 2, and 3 should occur more frequently as leading digits, while larger digits occur with decreasing frequency.

When examining each plot within FIG. 13, the following observations can be made:

1. Poisson distribution (normal traffic): The plot illustrating the Poisson distribution, known to adhere to Benford's Law, provides a baseline of comparison. The proportion of leading digits harmonizes with the expected frequencies dictated by Benford's Law.
2. Heavy-tailed traffic: For traffic governed by heavy-tailed distributions, depicted by the Pareto distribution, the plot unfolds with leading digits exhibiting a striking divergence from Benford's Law. Digits that should be common under Benford's Law are notably less frequent, indicating a fundamental shift from the expected pattern.
3. Fractal traffic: The fractal traffic model, depicted through the fractional Brownian motion approximation, similarly deviates from Benford's Law's anticipated distribution. This deviation accentuates the distinct nature of fractal traffic's leading digit distribution.
4. Mixture traffic with heavy-tailed: Here, the plot unravels as a fusion of Poisson and heavy-tailed traffic. While the objective might be to mirror Poisson's adherence to Benford's Law, this model, as demonstrated by the plot, falls short of perfect alignment.
5. Mixture traffic with fractal: Similarly, the mixture of Poisson and fractal traffic echoes a misalignment with Benford's Law. This amalgamation presents an opportunity for deeper investigation into the interaction between Poisson and fractal behaviors.
6. Mixture traffic with all: The most intricate plot emerges when amalgamating Poisson, fractal, and heavy-tailed traffic. The composite nature of this mixture seems to amplify the departure from Benford's Law, demonstrating the complex interplay of these varied traffic attributes.

This analysis resonates with the experimental findings showcased in FIGS. 4-6, affirming the notion that the considered traffic models representing malicious traffic indeed display substantial deviations from Benford's Law. It can be useful to recognize that these plots, while shedding light on the underlying trends, offer a simplified glimpse into the realm of real-world network dynamics. In the real world, the intricacies of malicious traffic can be multifaceted and less apparent than portrayed here. These visualizations serve as an entry point to understand core concepts, but they might not capture the nuanced behavior and interactions that unfold in live networks. Thus, while FIG. 13 is illuminating, it is vital to keep in mind the intricate dance of malicious and normal traffic beyond this simplified representation.

Exploring the Influence of Malicious Traffic Injection on Inter-Arrival Times Through Theoretical Modeling To demonstrate theoretically that the exponential rate of inter-arrival times is affected by injecting malicious traffic, queuing theory concepts can be used. Queuing theory provides mathematical models to analyze the behavior of queues and the arrival and service processes. In a system with normal traffic, where the inter-arrival times of packets follow an exponential distribution, the arrival rate is typically represented by the parameter k, which is the reciprocal of the mean inter-arrival time (1/p). Thus, the exponential distribution can be defined as:

$$P(x) = \lambda * \exp(-\lambda x)$$

where all the following are true: (U) P(x) is the probability density function (PDF) of the inter-arrival time x; λ is the arrival rate (λ=1/μ); e is Euler's number (approximately 2.71828); μ is the average inter-arrival time.

When malicious packets are injected into this normal traffic, it can disrupt the arrival process, leading to changes in the inter-arrival time distribution. The exact impact would depend on the nature of the malicious packet, the network conditions, and the queuing model. In most cases, the introduction of malicious traffic would likely result in an altered arrival process, causing deviations from the exponential distribution. In these queuing models, the impact of the malicious packet can be considered by modifying the inter-arrival rate (λ). The inter-arrival rate of the malicious packet can be represented by λ_malicious, while the normal traffic's inter-arrival rate is λ_normal. The overall inter-arrival rate based on the merging properties of Poisson Processes becomes:

$$\lambda_{overall} = \lambda_{normal} + \lambda_{malicious}$$

The overall inter-arrival rate λ_overall would affect the normal inter-arrival time distribution in the queue. Specifically, if the malicious packet is injected at regular intervals or in bursts, it could result in changes to the exponential distribution, potentially leading to increased packet delays or congestion in the network. Using Python's built-in tools and functions for developing this simulation, FIG. 14 demonstrates a representation of the malicious inter-arrival rate as a function of time, using a mathematical function that captures the desired behavior. A common approach is to use a periodic function to simulate time-varying malicious traffic, such as a sine wave. By modulating the amplitude and frequency of the sine function, variations in the malicious arrival rate over time can be created. The plots in FIG. 14 show the effect of the malicious inter-arrival rate on the Poisson function.

In Plot 1, bar graphs 1402 represent the distribution of inter-arrival rates for normal traffic (λ_normal), while the bar graphs 1404 represent the distribution of inter-arrival rates for the overall traffic (λ_overall). Plot 1 provides a clearer representation of the distribution differences when normal traffic is injected with malicious traffic showing how the bar graphs from a Poisson distribution are distorted from malicious injection.

Plot 2 compares the distribution of leading digits in Benford's Law with the leading digits distribution of the overall inter-arrival rates (λ_overall). The bar graphs 1406 represent the expected distribution of leading digits according to Benford's Law. The bar graphs 1408 represent the actual distribution of leading digits in the inter-arrival rates of the overall traffic (λ_overall). The figure demonstrates how well the actual tainted distribution conforms to Benford's Law and provides insights into the nature of the data, which in this case deviates substantially from the normal rate of a Poisson distribution. Note the similarity between FIG. 14 and the malicious plots presented in FIGS. 5 and 6. Each plot offers a different perspective on the interaction between normal and malicious traffic inter-arrival rates and how this interaction impacts the overall inter-arrival rate distribution. This collection of plots helps in understanding how injected malicious traffic affects the overall traffic patterns and whether they adhere to known statistical distributions like Benford's Law.

Enhancing Network Anomaly Detection and Diagnostic Capabilities: Leveraging Benford's Law and Queuing Theory in the Analysis of Internet Traffic and Equipment Anomalies In the scope of this work, it is important to acknowledge instances where benign PCAP data depart from the expected Benford's distribution. Such deviations may arise due to hardware irregularities or malfunctions rather than malicious actions. These deviations yield valuable insights into broader network behavior, serving as crucial diagnostic indicators, especially when malware isn't the root cause. Network disturbances resulting from hardware failures can manifest diversely, causing deviations from the anticipated exponential patterns in inter-arrival times. These disruptions can result from hardware glitches, congestion, transmission errors, or suboptimal configurations. For example, malfunctioning routers, switches, or network interface cards can introduce anomalies in packet transmission, leading to unanticipated delays or drops. Such irregularities contribute to non-exponential distributions of inter-arrival times due to sporadic packet transmission. Moreover, network congestion arising from equipment limitations or insufficient bandwidth allocation can trigger packet queuing and delays, disrupting expected inter-arrival time patterns. Transmission errors, whether due to faulty cabling or physical interference, can lead to packet retransmissions or communication interruptions, further causing irregularities in inter-arrival times. Likewise, suboptimal network configurations, like misconfigured quality of service policies or improper load balancing, can result in uneven packet routing and distribution, inducing inconsistencies in inter-arrival times. It can be important to discern that deviations from equipment failures or network disruptions can be challenging to distinguish from malicious activities. However, both cases underscore the significance of sophisticated anomaly detection mechanisms based on Benford's Law and queuing theory. Integrating such tools empowers network operators to swiftly identify and differentiate potentially benign hardware anomalies from potentially harmful cyber intrusions. Additionally, discussing these benign deviations caused by equipment failures enhances the article's breadth by showcasing the practical relevance of its insights beyond cybersecurity, highlighting its contributions to network diagnostics, problem-solving, and operational optimization.

The research presents a comprehensive framework that effectively combines Benford's Law, Poisson processes, and queuing theory concepts for addressing anomaly detection in internet traffic analysis. The integration of these methodologies can potentially enable operators to detect and differentiate between benign and malicious traffic, facilitating timely responses to potential security threats. Benford's Law, with its light-weight implementation, easy interpretation, and low computational requirements, proves to be an excellent candidate for quick decision-making in problems involving large datasets, such as PCAP files and Zeek logs.

Experimental results have demonstrated the prospective effectiveness of Benford's Law in distinguishing between benign and malicious traffic patterns. The incorporation of deep learning models further enhances anomaly detection capabilities. Furthermore, research has demonstrated that the integration of Benford's Law, Poisson processes, and queuing theory concepts can significantly optimize cyberspace security and defense environments. By reducing complexity and operator workload while enabling swift detection and response to potential security threats, the proposed approach proves valuable in safeguarding network systems against sophisticated cyber threats. The insights and visual representations showcased in this work can be derived, for example, from an all-encompassing web application developed using Python's Flask framework. This tool consists of interactive features, enabling users to input their preferences, execute operations, access pertinent contextual information, and gain valuable insights through illustrative graphics.

FIGS. 15A and 15B show an exemplary plot of how the examination of the first two digits could be used. A detailed exploration of the first two digits as the leading digits can be undertaken. This nuanced analysis could confer heightened granularity to the evaluation of Benford's Law, conceivably unveiling deeper insights into packet behavior.

In the context of applying Benford's Law to network traffic analysis using inter-arrival times, the leading digits of these times can serve as significant indicators of normal or anomalous behavior. A more focused explanation and step-by-step approach on how to use inter-arrival times and their leading digits for anomaly detection follows:

Detailed Steps for Anomaly Detection Using Inter-Arrival Times

1. Data Collection: Use network monitoring tools to capture traffic data and store it in PCAP files. Inter-arrival times are calculated as the time differences between consecutive packets.
2. Preprocessing: Extract the inter-arrival times from the PCAP files. This involves parsing the timestamps of packets and calculating the difference between consecutive timestamps.
3. Extract Leading Digits: For each inter-arrival time, extract the first digit. This can be done programmatically by converting the time (typically in seconds or milliseconds) to a string and taking the first character, or by using mathematical operations.
4. Frequency Distribution Calculation: Calculate the frequency distribution of the leading digits extracted from the inter-arrival times. How often each digit from 1 to 9 appears as the first digit can be tallied.
5. Statistical Comparison: Compare the observed frequency distribution of the leading digits with the expected distribution according to Benford's Law. Benford's Law states that the leading digit d (1 through 9) in a set of natural numbers follows the logarithmic distribution: $P(d)=\log_{10}(1+1/d)$. Use statistical tests such as Chi-square or Kolmogorov-Smirnov to determine if there are significant deviations from the expected Benford distribution.
6. Anomaly Detection Using Koopman Operator: Define observables based on the deviations from Benford's Law. Each observable could represent the deviation of one digit's observed frequency from its expected frequency. Apply the Koopman Operator framework to model how these observables evolve. This involves constructing an operator that predicts the future state of these deviations. The Koopman framework could predict changes in network behavior by analyzing trends in these deviations over time.
7. Implement Detection Mechanisms: Develop a system to monitor these deviations in real-time. Anomalies are flagged if the deviations exceed predefined thresholds, indicating potential malicious activity or network issues. Implement visualizations and alerts to help network operators understand and respond to potential threats quickly.
8. Continuous Improvement and Calibration: Continuously adjust thresholds and refine statistical models based on the feedback from detected incidents and false alarms. Incorporate machine learning algorithms to adaptively learn from new patterns of traffic and improve the accuracy of anomaly detection over time.

By following these steps, the statistical properties of Benford's Law in conjunction with the predictive modeling capabilities of the Koopman Operator to enhance the detection of anomalies in network traffic can be leveraged. This approach is particularly useful in environments where rapid detection and response to network anomalies are critical.

To implement the Koopman Operator framework for modeling and predicting deviations from Benford's Law in network traffic analysis, observables that reflect these deviations and then construct the Koopman Operator that models how these observables evolve over time need to be defined. The following is an exemplary process for this:

Step 1: Define Observables

First, observables need to be defined. In the context of applying Benford's Law to inter-arrival times of network traffic, an observable can be the deviation of the observed frequency of a leading digit from its expected frequency according to Benford's Law.

Benford's Law Probability Distribution

Benford's Law provides the expected probability P(d) of a digit d (1 through 9) appearing as the leading digit:

$$P(d) = \log_{10}(1 + 1/d)$$

Observable Definition

For each digit d, define an observable $x_d$ which measures the deviation of the observed frequency of digit d from its expected frequency. If n is the total number of observations (inter-arrival times in this case), and $f_d$ is the observed frequency of digit d, the observable $x_d$ can be defined as:

$$x_d = f_d - n \cdot P(d)$$

Where P(d) is the probability of digit d according to Benford's Law.

Step 2: Collect Data and Calculate Observables

Collect Data:

Extract inter-arrival times from PCAP files.

Calculate the leading digit for each inter-arrival time.

Calculate Frequencies:

Calculate $f_d$, the frequency of each leading digit d.

Calculate Observables:

Compute $x_d$ for each digit using the formula provided.

Step 3: Apply the Koopman Operator Framework

Koopman Operator Concept

The Koopman Operator is a linear operator that acts on the space of observables. It describes how these observables evolve in time, theoretically predicting future states based on current and past data.

Koopman Operator Matrix: Assume the evolution of observables over discrete time intervals can be modeled linearly: $x_{t+1}=Kx_t$ Where:

$x_t$ is the vector of observables $x_d$ at time t.

K is the Koopman operator matrix, which needs to be determined.

Constructing the Koopman Operator

To construct the Koopman operator matrix K, one needs multiple observational data points over time:

Collect and compute $x_t$ at multiple time intervals (e.g., daily, weekly).

Use techniques such as Dynamic Mode Decomposition (DMD) to compute K.

DMD is a numerical algorithm used to compute the dominant modes of complex systems, which in this case helps approximate the Koopman operator.

Step 4: Predict Future States

Using the Koopman operator KK, predict future states of the observables: $x_{t+k}=K^k x_t$ where k is the number of time steps into the future desired to be predicted.

Step 5: Anomaly Detection

Detect Anomalies:

Compute $x_{t+k}$ using the Koopman operator.

Compare predicted deviations $x_{t+k}$ with thresholds to detect anomalies. Significant deviations from zero could indicate anomalies.

Refine Model:

Continuously update the model as more data becomes available.

Refine the Koopman operator K to improve accuracy and responsiveness.

By following these steps, one utilizes the theoretical framework of the Koopman operator to predict and monitor deviations from expected statistical behaviors (Benford's Law in this case), providing a powerful tool for anomaly detection in network traffic.

To deepen understanding of how the eigenvalues and eigenvectors derived from the Koopman Operator (approximated by A~ in Dynamic Mode Decomposition) help in assessing future states and their potential role in anomaly detection, their mathematical properties and practical application ought be considered in more detail.

Deriving Eigenvalues and Eigenvectors from A~

The approximation A~ serves as a finite-dimensional representation of the Koopman Operator. This linear operator predicts how observable functions of the state evolve over time, ideally capturing the intrinsic dynamics of the system from the observed data.

Mathematical Process:

Eigenvalue Problem: For A~, the eigenvalue problem is $A\sim v=\lambda v$, where v are the eigenvectors and λλ are the eigenvalues.

Computational Extraction: In Python, use NumPy's linalg.eig function to compute these values from A~.

```
python
import numpy as np
#Assuming A_tilde is already computed
eigenvalues, eigenvectors=np.linalg.eig(A_tilde)
```

Theoretical Interpretation:

Eigenvalues (λ): Reflect the growth or decay rates and oscillatory behavior of each mode. If $|\lambda|>1$, the mode grows over time (unstable); if $|\lambda|<1$, it decays (stable); if λ is complex, the mode oscillates.

Eigenvectors (v): Each eigenvector provides a spatial pattern that corresponds to a mode of behavior in the data. This mode evolves independently according to its eigenvalue.

Application in Predicting Future States

Dynamics Projection: The future state of the system can be projected using these eigenvalues and eigenvectors. For a given state $x_t$, the next state $x_{t+1}$ can be approximated as:

$$x_{t+1} \approx A\sim \cdot x_t$$

Iteratively, this can be extended for multiple steps into the future.

Mode Reconstruction:

$$x_t \approx \sum_{i=1}^{r} b_i v_i e^{\lambda_i t}$$

Here, bi are coefficients that represent how much each mode contributes to the initial state, calculated from the initial conditions and the eigenvectors.

Using Eigenvalues and Eigenvectors for Anomaly Detection

Anomaly Identification:

Growth Rate Analysis: Modes with |λ| significantly greater than 1 may indicate developing anomalies or instabilities.

Oscillatory Behavior: Complex eigenvalues with high imaginary components may indicate cyclic or repeating patterns that could be normal or abnormal, depending on the context.

Setting Thresholds Programmatically:

Thresholds can be set based on historical data or domain knowledge to flag behavior as anomalous. For example:

```
python
#Define thresholds
growth_threshold=1.1 #Consider growth rates>10% as potentially anomalous
decay_threshold=0.9 #Consider decay rates<10% as potentially decaying too fast
#Check eigenvalues
for i, val in enumerate(eigenvalues):
    if abs(val)>growth_threshold or abs(val)<decay_threshold:
        print(f"Mode {i+1} with eigenvalue {val} is flagged as anomalous")
```

Operational Implication:

This analysis allows operators to monitor system health, predict performance, and preemptively address issues before they escalate.

In summary, the eigenvalues and eigenvectors provide a mathematically rigorous yet computationally feasible way to forecast system behavior, detect potential anomalies, and understand underlying dynamics. By setting appropriate thresholds based on these metrics, one can effectively program a system to detect and react to changes that might signify normal fluctuations or critical conditions.

To understand how eigenvalues and eigenvectors (or modes) are derived from the Koopman Operator in the context of Dynamic Mode Decomposition (DMD) and how Python assists in computing these values, let's dive into the theoretical and computational aspects:

Theoretical Foundation

Koopman Operator:

The Koopman Operator is a linear operator that acts on the space of observable functions defined on the state space of a dynamical system. For a system defined by $x_{t+1}=f(x_t)$ $x_{t+1}=f(x_t)$, the Koopman operator K propagates these observables forward in time.

Eigenvalues and Eigenvectors:

Eigenvalues (λ) of the Koopman operator represent the growth rates and frequencies of the dynamics. An eigenvalue with a magnitude greater than one suggests exponential growth, less than one suggests decay, and complex eigenvalues indicate oscillatory behavior.

Eigenvectors (or DMD modes) corresponding to these eigenvalues describe the spatial patterns associated with these temporal behaviors. Each mode is invariant under the dynamics defined by the Koopman operator and evolves according to its eigenvalue.

Computational Process Using Python

The eigenvalues and eigenvectors of the Koopman operator are approximated through the DMD algorithm, which involves the following computational steps:

Data Setup:

Organize the state data into matrices X and X' as described earlier, where X contains state vectors at initial times and X'X' contains state vectors at subsequent times.

Apply Singular Value Decomposition (SVD):

Perform SVD on matrix X: X=UΣV*.

This decomposition separates the data into orthogonal components (modes in U) and their singular values (Σ), which scale the modes.

Compute the DMD Matrix A~:

A~=U*X'VΣ$^{-1}$ is the projection of the Koopman operator onto the space spanned by the columns of U. This matrix is a finite-dimensional approximation of the Koopman operator.

Extract Eigenvalues and Eigenvectors:

Calculate the eigenvalues and eigenvectors of A~:

Eigenvalues,Eigenvectors=np.linalg.eig(A~)

These eigenvalues and eigenvectors represent the approximate dynamic modes and their evolution characteristics.

Python Implementation

Here's a Python snippet that outlines the extraction of eigenvalues and eigenvectors:

```
python
import numpy as np
#Assume U, Sigma, Vh from the SVD of X, and X' are
  already defined
Sigma_inv=np.diag(1/np.diag(Sigma))
A_tilde=U.conj( ).T @X' @ Vh.T @ Sigma mv
#Compute eigenvalues and eigenvectors
eigenvalues, eigenvectors=np.linalg.eig(A_tilde)
print("Eigenvalues:", eigenvalues)
print("Eigenvectors:", eigenvectors)
```

Interpretation of our Results

Eigenvalues:

- 0.52134617+0j0.52134617+0j: Indicates a decaying mode with no oscillation.
- −0.97255891±1.00897113j: Indicates modes that are oscillatory and decaying, given their complex nature and magnitude slightly above 1, suggesting a dynamic but unstable behavior.

Eigenvectors:

The vectors are complex, indicating that the corresponding dynamic modes are not only changing in magnitude but also oscillating in phase and amplitude.

In this process, Python's numerical libraries (like NumPy) play a crucial role in efficiently handling matrix operations and complex calculations, providing a powerful toolset for analyzing and predicting dynamical systems. This approach bridges theoretical dynamical systems analysis with practical data-driven applications, enabling deeper insights into the temporal evolution of complex systems.

From the Data:

Eigenvalues:

$$0.52134617 + 0j0.52134617 + 0j$$
$$-0.97255891 + 1.00897113j - 0.97255891 + 1.00897113j$$
$$-0.97255891 - 1.00897113j - 0.97255891 - 1.00897113j$$

Eigenvectors (Modes):

$$[0.93657468 + 0j, -0.20269442 + 0.20803498j, -0.20269442 - 0.20803498j], [-0.32489434 + 0j, -0.77434511 + 0j, -0.77434511 - 0j], [-0.13142125 + 0j, -0.22281064 + 0.51612158j, -0.22281064 - 0.51612158j][0.93657468 + 0j, -0.20269442 + 0.20803498j, -0.20269442 - 0.20803498j], [-0.32489434 + 0j, -0.77434511 + 0j, -0.77434511 - 0j], [-0.13142125 + 0j, -0.22281064 + 0.51612158j, -0.22281064 - 0.51612158j]$$

Analysis of DMD Results

Eigenvalues:

- 0.5213+0j0.5213+0j: This eigenvalue has a magnitude less than 1 and no imaginary part, indicating a decaying mode that does not oscillate.
- −0.9726±1.0089i−0.9726±1.0089i: These complex conjugate eigenvalues have magnitudes greater than 1 and significant imaginary parts. The negative real part combined with the magnitude suggests oscillatory behavior with a growing amplitude, which means these dynamics are both oscillating and decaying over time, influenced by the cycle defined by the imaginary part.

DMD Modes (Eigenvectors):

For the eigenvalue 0.52130.5213: The corresponding DMD mode is predominantly positive for the first component and negative for the other two, suggesting that the first variable might have a different dynamic compared to the other two.

For the eigenvalues −0.9726±1.0089i−0.9726±1.0089i: The modes are complex and show more significant components in the negative directions for the second and third components, indicating complex dynamic interactions between these variables. The oscillatory nature is reflected in the imaginary parts of these modes.

Interpretation and Implications

Decaying Mode: The presence of a decaying mode (0.52130.5213) implies that certain dynamics within the system are losing energy or influence over time. This might correspond to processes or factors that were initially strong but are becoming less significant.

Oscillatory and Decaying Modes: The complex conjugate pair with oscillatory behavior indicates that there are cycles in the data, which grow and decay over time. This could be related to recurring patterns that change in intensity, potentially influenced by external factors or internal system dynamics.

Spatial Patterns: The real parts of the eigenvectors (modes) highlight how each component (digit's deviation)

contributes to the overall dynamics. Modes with different signs across components suggest that these components interact or contribute differently to the system's behavior.

Next Steps

Further Analysis: Look into which specific weeks or components contribute most to the oscillatory dynamics and whether these align with any external events or changes in policy/processes during those times.

Model Validation: Consider validating these findings with additional data or through alternative methods to ensure the robustness of the detected patterns.

Decision Making: Use insights from this analysis to inform decisions, particularly if certain patterns are undesirable or indicate potential issues. Adjust strategies or processes accordingly based on the dominant dynamics revealed by DMD.

This analysis provides a deep dive into the underlying patterns and trends in data, revealing complex interactions and dynamics that might not be apparent from direct observation.

The Koopman eigenvalues and the DMD Modes matrix derived from the Dynamic Mode Decomposition (DMD) analysis of data provide key insights into the dynamics of an underlying system system. Based on the results here is a detailed explanation of these components:

Koopman Eigenvalues

The eigenvalues of the Koopman operator that were obtained are:

$$0.52134617+0j0.52134617+0j$$

$$-0.97255891+1.00897113j-0.97255891+1.00897113j$$

$$-0.97255891-1.00897113j-0.97255891-1.00897113j$$

Interpretation:

0.52134617+0j0.52134617+0j: This eigenvalue has a magnitude less than 1 and no imaginary part, indicating a decaying mode with no oscillatory behavior. This suggests that the corresponding dynamic is losing its influence over time without any periodic fluctuations.

−0.97255891±1.00897113j−0.97255891±1.00897113j: These complex conjugate eigenvalues are characteristic of dynamics that both decay and oscillate. The magnitude of these eigenvalues is slightly over 1

$$((-0.97255891)2+(1.00897113)2\approx 1.405(-0.97255891)2+(1.00897113)2$$

≈1.405), indicating that the dynamics are somewhat unstable or divergent, featuring growth in amplitude along with oscillations.

DMD Modes Matrix

The DMD modes matrix, corresponding to these eigenvalues, is:

$$[0.93657468+0j-0.20269442+0.20803498j-0.20269442-0.20803498j$$

$$-0.32489434+0j-0.77434511+0j-0.77434511-0j$$

-continued $$-0.13142125+0j-0.22281064+0.51612158j-0.22281064-0.51612158j]$$

Interpretation:

First Column (Real mode): Represents the mode associated with the real eigenvalue 0.521346170.52134617. The positive value for the first component and negative values for the other two suggest how each variable contributes differently to this decay process.

Second and Third Columns (Complex modes): These columns represent the modes associated with the complex conjugate pair of eigenvalues. The real parts show how the variables contribute to the oscillatory behavior, and the imaginary parts indicate the phase and amplitude of oscillations across these variables.

Using the Koopman Eigenvalues and DMD Modes:

Temporal Behavior: The decay and oscillation patterns identified through these eigenvalues and modes can help predict future behavior and understand underlying trends in the data.

Spatial Patterns: The distribution of values in the DMD modes indicates how each variable (e.g., deviations per digit) influences the overall dynamics described by each mode.

Explanation of X and X' Configuration

In DMD, the setup where X consists of data from week1 to week3 and X' consists of data from week2 to week4 is a common technique used to establish a framework for the system's dynamics over time. This configuration doesn't predict the future directly from past data in the conventional sense (like forecasting next week's values from this week's data alone). Instead, it serves a slightly different purpose:

Understanding Dynamics: By setting up XX and X' this way, where X' is essentially X shifted one unit forward in time, DMD aims to capture and model the dynamic transitions between consecutive states (weeks, in this case). This model allows us to understand how one state leads to the next.

Linear Operator Approximation (A~): The matrix A~ computed from X and X' essentially serves as a linear approximation of the Koopman operator, which describes how features in the data evolve over one time step. A~ is calculated to best transform X into X' under the constraints of linear dynamics.

Using A~ for Prediction

Once A~ is obtained, it can indeed be used to predict future states, but the key is how it is used:

Extend Beyond X': If it is desired to predict further into the future (beyond the data used to compute A~), the last column of X' can be taken (or any end state in the actual data sequence) and apply A~ to predict the next state. This can be iteratively done to forecast multiple steps ahead based on the model learned.

For example, if X' ends at week4, and the state for week5 is desired to be predicted, compute: week5≈A~·week4

Illustration with Python Code

Here's how one might calculate one future state beyond existing data using A~A~ in Python:

python

#Assuming A_tilde is already computed and the last column of X_prime (week4 data) is known week4=X_prime[:, −1]#The last column from X_prime which represents the latest known state

#Predicting the next week (week5) using A_tilde
week5_predicted=A_tilde @ week4
print("Predicted deviations for week5:", week5_predicted)

This approach allows the dynamics learned from X and X' to inform predictions about the future based on the latest known data, leveraging the linear dynamic model encapsulated by A~. This method is powerful for systems where linear approximations of the dynamics are reasonable and can provide insightful forecasts about future states.

As more data is gathered over time, the model can be updated to better understand and capture the evolving dynamics of the system. Here's how one can proceed:

Updating DMD with More Data

Incorporating New Data:

As additional weeks of data are collected, this additional data can be appended to existing datasets (X and X'). For instance, if initial data is from weeks 1 to 4, and then obtain data for weeks 5 to 8, XX can be extended to include weeks 1 to 7 and X' to include weeks 2 to 8.

Recomputing the Koopman Operator:

With the updated datasets, perform SVD on the new XX and compute a new A~ using the same process as before. This involves recalculating U, Σ, V*, and then $$A\sim = U * XV\sum^{-1}.$$

This updated A~ will reflect more comprehensive dynamics considering the additional data.

Reevaluating the Dynamics:

By extracting new eigenvalues and eigenvectors from the updated A~, one may assess how the system's dynamics might have changed or stayed consistent over the extended period.

This allows for a more robust analysis, potentially revealing new patterns or confirming the stability of previously observed dynamics.

Considerations for Expanding Data

Growing Dimensions: As more data is included, the size of X and X' will indeed grow, potentially leading to larger computations. While DMD handles large datasets efficiently, the computational complexity can increase, particularly the cost of performing SVD, which scales with the size of the data matrix.

Computational Efficiency: For very large datasets, consider techniques to reduce computational load, such as incremental SVD or randomized SVD algorithms, which can handle large matrices more efficiently without recalculating the entire decomposition from scratch.

Adaptive Models: In some cases, rather than expanding X indefinitely, one might opt to use a sliding window approach where only the most recent data is used to reflect the most current dynamics. This approach can be particularly useful in non-stationary environments where older data may become less relevant.

Python Implementation

If it is decided to update XX and X'X' with new data, Python code would need to append new data appropriately and recompute A~. Here's a simplified approach to updating the dataset:

python
#Append new data to X and X_prime
new_data=np.array([ . . . ]) #New weeks of data
X=np.hstack([X, new_data[:, :−1]]) #Extend X with new data except the last new column
X_prime=np.hstack([X_prime, new data[:, 1:]]) #Extend X' with new data starting from the second new column
#Recompute SVD and A_tilde
U, s, Vh=np.linalg.svd(X, full_matrices=False)
Sigma_inv=np.diag(1/s)
A_tilde=U.conj).T @ X_prime @ Vh.T @ Sigma_inv
#Re-extract eigenvalues and eigenvectors
eigenvalues, eigenvectors=np.linalg.eig(A_tilde)

This method keeps the model dynamic and responsive to new data, providing ongoing insights into the system's behavior as it evolves.

To calculate A~ from the expression $A\sim = U^{H}X'V\Sigma^{-1}$, it will first be need to perform the Singular Value Decomposition (SVD) of the data matrix X, and then use the results to compute each component. Here's a step-by-step breakdown of how to do this using Python, specifically with the numpy library:

Step 1: Perform SVD on Matrix XX

The Singular Value Decomposition (SVD) of a matrix X will decompose it into three matrices U, Σ, and $V^{H}$ (where VH is the conjugate transpose of V):

U contains the left singular vectors,
X is a diagonal matrix containing the singular values,
$V^{H}$ contains the right singular vectors.

In Python, numpy.linalg.svd can be used to perform this decomposition:

python
import numpy as np
#Assuming X is the data matrix
U, s, Vh=np.linalg.svd(X, full_matrices=False)
U will be the matrix of left singular vectors.
s is the array of singular values. To use it in matrix operations, first convert it into a diagonal matrix:
python
Sigma=np.diag(s)
Vh is the conjugate transpose of V (right singular vectors).

Step 2: Compute Σ−1Σ−1

To compute $\Sigma^{-1}$, the inverse of the diagonal matrix Σ, take the reciprocal of each non-zero element in Σ:

python
Sigma_inv=np.diag(1/s)

Step 3: Compute U*

U* is the conjugate transpose of UU. In Python, this can be computed with:

python
UH=U.conj( ).T

Step 4: Compute A~A~

Now that all the necessary components are present, A~ can be computed by performing matrix multiplications:

python
A_tilde=UH @X_prime @ Vh.T @ Sigma mv
Here:
UH is U*,
X_prime is the matrix X' containing the data shifted by one time unit,
Vh.T is the transpose of V* (which gives V),
Sigma_inv is Σ−1Σ−1.

Complete Python Example

Combining all the steps, the Python code to compute A~ might look like this:

python
import numpy as np
#Example data for X and X_prime
X=np.random.randn(100, 3) #Replace with the actual data
X_prime=np.random.randn(100, 3) #Replace with the actual shifted data

```
#Perform SVD
U, s, Vh=np.linalg.svd(X, full_matrices=False)
#Compute necessary matrices
Sigma_inv=np.diag(1/s)
UH=U.conj( ).T
#Compute A_tilde
A_tilde=UH @X_prime @Vh.T @ Sigma_inv
print("A_tilde:\n", A_tilde)
```

This script will output A~, which approximates the best-fit linear operator mapping X to X', effectively providing insights into the dynamics governing the transitions in the data. This matrix is key to understanding and predicting system behavior based on observed data.

The theoretical basis of how the components of A~ are calculated using Singular Value Decomposition (SVD) and how these components interact to form the DMD approximation of the Koopman operator should be considered. This will provide a deeper understanding of the linear algebra involved.

Singular Value Decomposition (SVD)

SVD Breakdown: For a given matrix XX (which represents the system state at multiple time steps), SVD decomposes XX into three matrices:

- U: An m×m unitary matrix (if full SVD is used, but typically reduced in size depending on the rank of X). The columns of U (called left singular vectors) form an orthonormal basis for the column space of X.
- Σ: An m×n diagonal matrix (for a full SVD, but can be reduced to a smaller square matrix based on the rank), with non-negative real numbers on the diagonal. These numbers are called singular values and are sorted in descending order. They measure the contribution of each corresponding singular vector to the structure of X.
- V*: An n×n unitary matrix, where VH (the conjugate transpose of V) contains the right singular vectors of X. These vectors form an orthonormal basis for the row space of X.

Construction of A~

From SVD to A~: The computation of A~ from the SVD components involves mapping the dynamics encoded between X and X' through the best-fit linear operator:

- U*: This is the conjugate transpose of U. It effectively transforms the column space of X into a coordinate system aligned with the left singular vectors. This transformation is crucial because it reduces the subsequent calculations to the most significant orthogonal components (determined by the singular values), thereby filtering noise and emphasizing the most impactful dynamics.
- X': This matrix represents the system state at subsequent time steps. The multiplication U*X" projects X' onto the left singular vectors of X, aligning it within the same reduced coordinate system and facilitating a direct comparison and linear transformation from X.
- $V\Sigma^{-1}$: After X' has been projected onto the reduced basis by U*, the product $V\Sigma^{-1}$ applies a transformation using the right singular vectors and inversely scales by the singular values. This step essentially normalizes the contribution of each dimension, accounting for the varying importance (as indicated by X), and completes the transformation from X to X'.

The final multiplication $A\sim=U^*X'V\Sigma^{-1}$ results in a matrix that best linearly maps the transformed X (now represented in the reduced SVD coordinate system) to the transformed X'. The matrix A~ thus encapsulates the essential linear dynamics of the system as observed over the sampled times.

Theoretical Importance

This theoretical approach using SVD and subsequent matrix operations ensures that A~ emphasizes the most statistically significant features of the dynamics, reduces the impact of noise or less relevant fluctuations, and provides a robust framework for analyzing complex systems. The eigend composition of A~ further refines this by isolating individual modes of behavior (each associated with a specific eigenvalue and eigenvector), which describe independent dynamic patterns within the system.

Thus, the theoretical computation of A~ via SVD and matrix manipulations is not only a foundational method in data-driven dynamics but also a powerful tool in predictive modeling and system analysis.

To deepen understanding of how the eigenvalues and eigenvectors derived from the Koopman Operator (approximated by A~A~ in Dynamic Mode Decomposition) help in assessing future states and their potential role in anomaly detection, the mathematical properties and practical application should be considered in more detail.

Deriving Eigenvalues and Eigenvectors from A~

The approximation A~A~ serves as a finite-dimensional representation of the Koopman Operator. This linear operator predicts how observable functions of the state evolve over time, ideally capturing the intrinsic dynamics of the system from the observed data.

Mathematical Process:

- Eigenvalue Problem: For A~, the eigenvalue problem is A~v=λv, where v are the eigenvectors and λ are the eigenvalues.
- Computational Extraction: In Python, use NumPy's linalg.eig function to compute these values from A~.

```
python
import numpy as np
#Assuming A_tilde is already computed
eigenvalues, eigenvectors=np.linalg.eig(A_tilde)
```

Theoretical Interpretation:

- Eigenvalues (λ): Reflect the growth or decay rates and oscillatory behavior of each mode. If |λ|>1, the mode grows over time (unstable); if |λ|<1|λ|<1, it decays (stable); if λ is complex, the mode oscillates.
- Eigenvectors (vv): Each eigenvector provides a spatial pattern that corresponds to a mode of behavior in the data. This mode evolves independently according to its eigenvalue.

Application in Predicting Future States

Dynamics Projection: The future state of the system can be projected using these eigenvalues and eigenvectors. For a given state $x_t$, the next state $x_t+1$ can be approximated as:

$$x_t + 1 \approx A\sim x_t$$

Iteratively, this can be extended for multiple steps into the future.

Mode Reconstruction:

$$x_t \approx \sum_{i=1}^{r} b_i v_i e^{\lambda_i t}$$

Here, $b_i$ are coefficients that represent how much each mode contributes to the initial state, calculated from the initial conditions and the eigenvectors.

Using Eigenvalues and Eigenvectors for Anomaly Detection

Anomaly Identification:

Growth Rate Analysis: Modes with I significantly greater than 1 may indicate developing anomalies or instabilities.

Oscillatory Behavior: Complex eigenvalues with high imaginary components may indicate cyclic or repeating patterns that could be normal or abnormal, depending on the context.

Setting Thresholds Programmatically:

Thresholds can be set based on historical data or domain knowledge to flag behavior as anomalous. For example:

```
python
#Define thresholds
growth_threshold=1.1 #Consider growth rates>10% as potentially anomalous
decay_threshold=0.9 #Consider decay rates<10% as potentially decaying too fast
#Check eigenvalues
for i, val in enumerate(eigenvalues):
    if abs(val)>growth_threshold or abs(val)<decay_threshold:
        print(f"Mode {i+1} with eigenvalue {val} is flagged as anomalous")
```

Operational Implication:

This analysis allows operators to monitor system health, predict performance, and preemptively address issues before they escalate.

In summary, the eigenvalues and eigenvectors provide a mathematically rigorous yet computationally feasible way to forecast system behavior, detect potential anomalies, and understand underlying dynamics. By setting appropriate thresholds based on these metrics, the system can effectively be programmed to detect and react to changes that might signify normal fluctuations or critical conditions.

The general result about growth rate analysis and oscillatory behavior derived from the eigenvalues of the Koopman operator (or its finite-dimensional approximation, A~) in the context of Dynamic Mode Decomposition (DMD) comes from fundamental concepts in dynamical systems theory and linear algebra. These concepts help to understand how systems evolve over time, and they form the basis for interpreting the system dynamics captured by the DMD analysis. Here's a detailed breakdown of how these interpretations are formulated:

1. Growth Rate Analysis from Eigenvalues

Magnitude of Eigenvalues: The absolute value I of an eigenvalue k determines the rate at which the associated mode grows or decays over time.

Stable Systems: If $|\lambda|<1$, the magnitude of the state vector associated with this eigenvalue shrinks over time, indicating a stable mode that decays exponentially. This means that any disturbances or deviations in this mode will diminish as time progresses.

Unstable Systems: Conversely, if $|\lambda|>1$, the state vector grows exponentially, which is characteristic of an unstable mode. This suggests that disturbances or deviations in this mode will increase, potentially leading to system instability or highlighting a driving force behind growing trends or anomalies.

Eigenvalue Analysis in Engineering and Physics: This concept is widely used in engineering (control systems, signal processing), physics, and other sciences to analyze stability. It's particularly important in feedback systems, where stability is crucial for system performance and safety.

2. Oscillatory Behavior from Eigenvalues

Complex Eigenvalues: When eigenvalues are complex, i.e., have both real and imaginary components ($\lambda=a+bi$), they describe modes that oscillate.

Frequency of Oscillation: The imaginary part bb of the eigenvalue relates to the frequency of the oscillation. The system's response will oscillate at a frequency proportional to this value, which can be interpreted through the Euler's formula $e^{i\theta}=\cos(\theta)+i\sin(\theta)$.

Damping Factor: The real part aa dictates how these oscillations decay (if $|a|<1|$) or grow (if $|a|>1$) over time. If aa is zero, the oscillation neither grows nor decays, leading to a purely periodic behavior.

3. Application in Prediction and Anomaly Detection

Predictive Analysis: By understanding which modes are growing, decaying, or oscillating, analysts can predict how the system will behave in the future. For example, a mode corresponding to a growing eigenvalue may suggest an upcoming failure or risk if left unchecked.

Anomaly Detection: Setting thresholds for eigenvalues helps in detecting anomalies. For instance, an unexpectedly high growth rate ($|\lambda|$ significantly greater than 1) might indicate a problem or an emerging issue within the system.

Mathematical Foundation in Systems Theory

Linear Differential Equations: Many physical and engineering systems are described by linear differential equations, where the solution often involves terms like $e^{\lambda t}$. The characteristics of X directly influence the solution's behavior over time, forming a bridge to system dynamics observed in real-world processes.

Programming these Concepts

In practice, systems analysts and engineers often program these concepts into monitoring tools or diagnostic systems to continually assess system health, predict future states based on current data, and identify when the system's behavior deviates from expected patterns due to anomalies, component failures, or external disturbances.

This theoretical foundation not only supports practical applications but also enhances the ability to design robust, efficient, and predictive systems across various fields.

The intuition and reasoning behind using the Singular Value Decomposition (SVD) to compute the Dynamic Mode Decomposition (DMD), which approximates the Koopman operator, rather than directly calculating $A\sim=X'X^{-1}$, are rooted in several mathematical and practical considerations. Let's break down why SVD is preferred and how it relates to the robustness and reliability of the analysis.

Direct Inversion: $A\sim=X'X^{-1}$

Direct Inverse Method: The formula $A\sim=X'X^{-1}$ suggests directly computing the inverse of X and then multiplying it by X' to get a linear map from X to X'. Conceptually, this method seems straightforward because it directly computes the matrix that maps X onto X'.

Problems with Direct Inversion:

Sensitivity to Noise and Data Quality: Direct inversion is highly sensitive to measurement noise and errors in data. In practical scenarios, especially with complex systems data, small errors in XX can lead to large errors in $X^{-1}$, and hence in A~.

Numerical Instability: If X is not square or is singular (which is common in real-world datasets where the number of state variables does not match the number of measurements), then X does not have a true inverse, and the computation either becomes impossible or requires regularization techniques that can complicate the model.

Overfitting: Using $X^{-1}$ directly can lead to overfitting, especially if the dataset is not large enough to represent the underlying dynamics comprehensively.

Using SVD for $A\sim=U^H X'V\Sigma^{-1}$

Robustness to Noise and Singularities: SVD decomposes XX into $U\Sigma V^H$, where E contains the singular values that indicate the importance of each mode in the data. By using $X^{-1}$ in the computation of A~, the problem can effectively be regularized-ignoring or downweighting the components of X that are less significant (have smaller singular values), which are often those most affected by noise.

Dimensionality Reduction: SVD allows for dimensionality reduction, where only the most significant singular values (and their corresponding singular vectors in U and V) are retained. This leads to a more compact, and often more interpretable, description of the dynamics.

Optimal in Least-Squares Sense: The projection $U^H X'V\Sigma^{-1}$ minimizes the least squares error between the actual X' and the predicted X' from the model A~X. This is because SVD provides the best low-rank approximation of X, making A~ optimal in the sense of capturing the most significant dynamic behavior within the data.

Practical Implication and Usage

The use of SVD in computing the DMD (and thus approximating the Koopman operator) ensures that the resulting model A~ is both robust to typical data issues like noise and missing data and capable of capturing the most critical dynamic features of the system. This method enhances both the accuracy and utility of the model in real-world applications where data quality and system complexity can vary significantly.

Using Python and libraries like NumPy to perform these calculations harnesses efficient, well-optimized algorithms for SVD, making this approach both practical and powerful for systems analysis, control engineering, and data-driven dynamics studies.

The use of $U^H X'V\Sigma^{-1}$ in deriving the Dynamic Mode Decomposition (DMD) and approximating the Koopman operator stems from the intersection of mathematical theory and practical needs in the analysis of complex dynamical systems. This formulation is not arbitrary; rather, it's the result of trying to capture the most relevant dynamic behaviors in a dataset while dealing with the practical challenges of real-world data analysis, such as noise, incompleteness, and the need for dimensionality reduction.

Foundations of the DMD Method

Linear Dynamical Systems Theory:

In its simplest form, in a dynamical system where states evolve linearly, then $X'\approx AX$ describes this evolution, where A is the matrix that maps the state at time t to the state at time t+1.

Ideally, $A=X'X^{-1}$ if X is square and invertible. However, in practical scenarios, X is rarely square and often ill-conditioned (not invertible or near singular).

Projection onto Principal Components:

SVD provides a way to express X in terms of its principal components, $X=U\Sigma V^H$, where each component is sorted by its importance (or energy) in the dataset.

This decomposition separates noise and less important information (contained in the components with smaller singular values) from the significant, robust patterns in the data.

Optimal Low-Rank Approximation:

By projecting the data onto the space spanned by the significant singular vectors, the transformation $U^H X'V\Sigma^{-1}$ effectively provides the best low-rank approximation of the linear operator A in a least-squares sense.

This approach reduces the effect of noise and overfitting, which are common problems in direct inverse methods like $X'X^{-1}$.

Practical and Theoretical Benefits

Dimensionality Reduction and Noise Filtering: Using U and V from the SVD helps focus the analysis on the most dynamically significant modes and ignore components that might be dominated by noise.

Robustness: $\Sigma^{-1}$ regularizes the problem by mitigating the influence of components associated with small singular values (which represent noise or less informative aspects of the data).

Mathematical Justification

Projection Method: The computation $U^H X'V\Sigma^{-1}$ can be seen as a projection method where:

X' is projected onto the left singular vectors (UU),

Transformed into the coordinate system defined by the right singular vectors (V), And scaled appropriately by the inverse of the singular values ($\Sigma^{-1}$), which accounts for the differing energies or importances of these directions.

Implementation and Usage

Eigenvalue Decomposition of A~: Once A~ is computed, its eigenvalues and eigenvectors can be calculated, which provide insights into the growth rates, decay, and oscillatory behavior of the system's modes. These are crucial for understanding the dynamics of the system and for predicting future states.

This method, therefore, not only fits within the theoretical framework of linear systems analysis but also addresses practical data challenges, making it highly effective for empirical data analysis in fields like fluid dynamics, finance, neuroscience, and more where data-driven modeling of complex systems is essential.

Testing Koopman Operator with Benford

Inject a network with benign PCAP files, say 40, one after another, if it is assumed each PCAP file comes in every day for 40 days (doesn't have to be 40 days, it can be shorter or longer). These PCAP files will define the state of the network.

As PCAP files are coming in the python program inserts randomly, say, 3 malicious PCAP files; so it may be desired to process these PCAPS as they are being loaded according to this paper—described above; the leading digit from inter-arrival times can be extracted, the deviations from observed frequency and expected frequency can be determined, and the Koopman Operator can be constructed, then eigenvalues and eigenvectors can be calculated in order to determine the state of the network environment for every PCAP that is processed to determine either benignity or anomalous.

In some embodiments, all this data may be collected in a plot, that is, eigenvalues versus the PCAP number coming in.

Integrating Koopman Operator into Flask Program

To integrate the Koopman Operator into existing Flask program for dynamic anomaly detection based on PCAP file analysis, follow a structured approach that incrementally updates the Koopman Operator as new data becomes available. This involves:

Calculating observables from the PCAP files (e.g., leading digit probabilities, Kullback-Leibler divergence).

Updating the Koopman Operator dynamically with each new PCAP file.

Computing the eigenvalues of the Koopman Operator to assess system dynamics.

Overview of Integration

Persistent Data Storage:

To effectively update the Koopman Operator, maintain a persistent state across different PCAP file uploads. This could be achieved by storing the previous state (e.g., the observables from previous files) in a server-side variable or a database.

Koopman Operator Calculation:

Define a function to update the Koopman Operator matrix with new observables from each PCAP file.

Compute eigenvalues after each update to monitor changes in system dynamics.

Modify Flask Endpoint:

The Flask endpoint handling file uploads should be adapted to perform the above calculations each time a file is processed.

Detailed Steps

Step 1: Define Koopman Operator Update Function

In the Python Flask application, define a function to manage the Koopman Operator updates:

```
import numpy as np
def update_koopman_operator(observables, koopman_matrix=None):
    """
    Update or initialize the Koopman Operator matrix with new observables.
    :param observables: New observable data from the current PCAP file.
    :param koopman_matrix: The existing Koopman Operator matrix.
    :return: Updated Koopman Operator matrix.
    """
    if koopman_matrix is None:
        #Initialize the Koopman Operator matrix
        koopman_matrix=np.array([observables])
    else:
        #Update the Koopman Operator matrix by appending new observables
        koopman_matrix=np.vstack([koopman_matrix, observables])
    #Optionally, perform dimensionality reduction or regularization here
    return koopman_matrix
```

Step 2: Compute Eigenvalues of the Koopman Operator

After updating the Koopman matrix, calculate its eigenvalues to assess the dynamics:

```
def compute_eigenvalues(koopman_matrix):
    """
    Compute the eigenvalues of the Koopman Operator matrix.
    :param koopman_matrix: The Koopman Operator matrix.
    :return: Eigenvalues of the matrix.
    """
    eigenvalues=np.linalg.eigvals(koopman_matrix @ koopman_matrix.T) #Example with a simple approach
    return eigenvalues
```

Step 3: Update Flask Route

Modify the/process endpoint to include these calculations:

```
from flask import Flask, request, jsonify, render_template
app=Flask(__name_)
koopman_matrix=None #Persistent storage of the Koopman matrix
@app.route('/process', methods=['POST'])
  def process_pcap( ):
    global koopman_matrix
    #Existing code to process PCAP and calculate observables (e.g., leading_digit_prob)
    #Example observable (this could be more complex and multidimensional)
    observables=leading_digit_prob #Assuming this is calculated somewhere in the route
    #Update the Koopman Operator with new observables
    koopman_matrix=update_koopman_operator(observables, koopman_matrix)
    #Compute the eigenvalues of the updated Koopman Operator
    eigenvalues=compute_eigenvalues(koopman_matrix)
    #Use the eigenvalues for further analysis or anomaly detection
    # . . .
    #Continue with the rest of route logic
    return render_template('results.html', eigenvalues=eigenvalues, . . . )
```

Final Integration

This setup adds a dynamic, ongoing analysis layer to an application, allowing monitoring of changes and anomalies over time as more PCAP files are processed. Also, it will be necessary to ensure the observables are correctly extracted from each PCAP file and that the Koopman matrix is appropriately handled across sessions, possibly requiring a more persistent storage solution depending on deployment environment.

There is no need to reload the entire Flask program for each update; instead, manage the state across requests as shown. If this application is deployed in a production environment where multiple instances might handle requests, consider using a more robust state management solution, such as a database or an in-memory data store like Redis, to maintain the state of the Koopman matrix across different requests and even server restarts.

Kullback-Leibler (KL) Divergence, also known as relative entropy, is a measure from information theory that quantifies how one probability distribution diverges from a second, expected probability distribution. KL divergence measures the expected number of extra bits required to code samples from PP (the true distribution) when using a code based on Q (the model or approximated distribution), rather than using a code based on P.

For discrete probability distributions PP and QQ defined on the same probability space, X, the KL divergence from Q to P is defined as:

$$D_{KL}(P\|Q) = \sum_{x \in X} P(x)\log\left(\frac{P(x)}{Q(x)}\right)$$

where P(x)P(x) is the probability of observing xx under the true distribution, and Q(x)Q(x) is the probability of observing xx under the approximate distribution. It's important to note that KL divergence is not symmetric, meaning $D_{KL}(P\|Q) \neq D_{KL}(Q\|P)$.

Applying KL Divergence to Benford's Law Using PCAP Files

In the context of network analysis using PCAP files, KL divergence can be applied to measure how much the distribution of the first digits of certain numerical data (like inter-arrival times) deviates from what is expected under Benford's Law. Here's a step-by-step guide on how to apply this:

Extract the First Digit:

- Process each PCAP file to extract inter-arrival times between packets.
- Extract the first digit of each inter-arrival time to form a dataset of first digits.

Calculate the Empirical Distribution:

- Count the frequency of each digit (1 through 9) in the dataset.
- Convert these counts to a probability distribution, PP, where P(d)P(d) is the proportion of times the digit dd appears as the first digit.

Expected Distribution Under Benford's Law:

- According to Benford's Law, the probability of a digit dd appearing first is given by $Q(d)=\log_{10}(1+1/d)$.
- Calculate Q for each digit from 1 to 9.

Compute KL Divergence:

- Calculate the KL divergence from the empirical distribution P to the Benford's Law distribution Q:

$$D_{KL}(P\|Q) = \sum_{d=1}^{g} P(d)\log\left(\frac{P(d)}{Q(d)}\right)$$

This value represents the "distance" or divergence of the observed first-digit distribution from what Benford's Law predicts.

Analysis and Interpretation:

Higher values of $D_{KL}(P\|Q)$ indicate greater divergence from Benford's Law, suggesting potential anomalies or non-conformity in the data, which could be indicative of manipulated or anomalous network behavior.

Plot $D_{KL}(P\|Q)$ against time or sequence of PCAP files to visually assess how network behavior deviates from expected statistical norms over time.

Threshold Setting for Anomaly Detection:

Establish a threshold for $D_{KL}(P\|Q)$ based on historical data or expert judgment. When KL divergence exceeds this threshold, flag the corresponding network activity as potentially anomalous.

Integration with Koopman Operator:

Use the KL divergence as an additional feature or metric within the broader framework of Koopman Operator analysis to enhance the detection capabilities for anomalous network behavior.

Implementing this method provides a robust statistical tool that complements the existing analysis, allowing better identification and understanding of deviations in network traffic that might signify underlying issues or security threats.

Integrating Kullback-Leibler Divergence into FlaskProgram

To integrate Kullback-Leibler divergence into the Flask application for detecting anomalies based on Benford's Law and pcap file analysis, these steps can be followed. This method will leverage the Kullback-Leibler divergence to measure how the observed distribution of leading digits (either the first digit or the first two digits) from pcap file analysis diverges from the expected Benford distribution.

Steps to Calculate Kullback-Leibler Divergence in Flask App:

Modify Flask Application:

Ensure Flask application extracts leading digit frequencies from pcap files. This data will be used.

Calculate Expected Benford Distribution:

For the first digit, Benford's Law states that the probability of digit d appearing first is:

$$P(d) = \log_{10}\left(1 + \frac{1}{d}\right)$$

For the first two digits, Benford's formula can be extended or precomputed values for the probabilities of each two-digit combination can be used.

Compute Kullback-Leibler Divergence:

After extracting the actual distribution of the digits from the pcap files (call this distribution Q), compute the KL divergence from the Benford distribution P to Q:

$$D_{KL}(P\|Q) = \sum_{d} P(d)\log\left(\frac{P(d)}{Q(d)}\right)$$

Ensure to handle cases where Q(d)=0 by defining P(d) log(P(d)/Q(d))=0 if P(d)=0, to avoid mathematical complications with the log function.

Implement KL Divergence Calculation:

Write a Python function to calculate the KL divergence. This function will be called after computation of the digit distributions from the pcap analysis.

Update Flask Endpoint:

After computing the KL divergence, integrate this value into the response of the Flask application, either displaying it directly in the HTML or using it to further analyze the anomalies.

Anomaly Detection:

Set a threshold for the KL divergence. If the divergence exceeds this threshold, flag the PCAP as potentially anomalous. This threshold can be determined based on historical data or set experimentally.

Update HTML Interface:

Modify the index3.html to include an option or display area for the KL divergence results. This might include visual feedback or a numerical display indicating the level of divergence.

Example Python Function for KL Divergence:

Here's a basic implementation of the KL divergence calculation:

```
import numpy as np
def calculate_kl_divergence(P, Q):
    kl_div = 0
    for p, q in zip (P, Q):
        if p > 0 and q > 0:
            kl_div += p * np.log(p/q)
    return kl_div
```

Integration in Flask Route:

Incorporate the KL divergence computation into the Flask route where pcap analysis occurs:

```
from flask import Flask, request, render_template
import numpy as np
app=Flask(__name_)
@app.route('/process', methods=['POST'])
def process_pcap( ):
    #The existing code to process PCAP and extract digit
      frequencies
    #Let's assume 'observed_frequencies' is the Q
    #Benford's distribution for the first digit
    digits=range(1, 10)
    benford=[np.log 10(1+1/d) for d in digits]
    #Calculate KL divergence
    kl_divergence=calculate_kl_divergence(benford,
      observed_frequencies)
    #Add KL divergence to the response
    return render_template('index3.html',
      kl_divergence=kl_divergence)
if _name_=='_main_':
    app.run(debug=True)
```

This setup allows integration of advanced statistical analysis directly into the Flask application for real-time anomaly detection based on network traffic data extracted from PCAP files.

To integrate the Kullback-Leibler divergence calculation into an existing Flask application, the structure of uploaded Python code must first be understood and the appropriate place to add the calculation identified.

Steps to Integrate KL Divergence Calculation

Identify the Data Processing Section:

Find where an application processes the PCAP files to extract inter-arrival times and calculates the frequency of the first digits or the first two digits. This is likely where the distributions are calculated that are compared against Benford's Law.

Add KL Divergence Function:

Implement the calculate_kl_divergence function in a module that is accessible to PCAP processing script. This function can be placed at the beginning of a script or in a separate utility module.

Compute Benford's Expected Distribution:

Immediately after or within the section where the observed frequencies of leading digits are calculated, add the code to compute the expected Benford distribution for comparison.

Call KL Divergence Calculation:

After computing both the observed and expected distributions, call the calculate_kl_divergence function with these distributions as arguments.

Utilize KL Divergence for Anomaly Detection:

Use the output from the KL divergence calculation to determine if the current PCAP file exhibits anomalous behavior based on a predefined threshold.

Update Results Handling:

Modify endpoint or result handling part of the Flask app to include information about the KL divergence calculation in the output, such as displaying it in an HTML template or logging it for further analysis.

Example Code Placement

Assuming the Flask application has a structure similar to this (simplified for demonstration):

```
from flask import Flask, request, render_template
import numpy as np
app=Flask(__name_)
def calculate_kl_divergence(P, Q):
    kl_div=0
    for p, q in zip(P, Q):
        if p>0 and q>0:
            kl_div+=p*np.log(p/q)
    return kl_div
@app.route('/process_pcap', methods=['POST'])
def process_pcap( ):
    #Example: Fetch PCAP processing result
    observed frequencies= . . . #This should come from
      PCAP analysis logic
    #Benford's distribution for the first digit
    digits=range(1, 10)
    benford=[np.log 10(1+1/d) for d in digits]
    #Calculate KL divergence
    kl_divergence=calculate_kl_divergence(benford,
      observed frequencies)
    #Use KL divergence for anomaly detection
    if kl_divergence>threshold: #Define threshold
      is_anomalous=True
    else:
      is_anomalous=False
    return render_template('index3.html',
      kl_divergence=kl_divergence,
      anomaly=is_anomalous)
if_name_=='_main_';
    app.run(debug=True)
```

To integrate the Kullback-Leibler divergence calculation into Flask application, one will need to calculate this divergence right after computing the frequencies of the first digits and the expected Benford distribution for those digits. This process will be done inside the/process route where packet processing and analysis are already handled.

Here's a detailed step-by-step guide to integrating the KL divergence calculation:

Step 1: Define the KL Divergence Function

At the beginning of Flask file (after imports but before defining routes), the function that calculates the Kullback-Leibler divergence should be defined:

```
import numpy as np

def calculate_kl_divergence(P, Q):
    kl_div = 0
    for p, q in zip(P, Q):
        if q > 0: # Only calculate where Q is not zero
            kl_div += p*np·log(p/q) if p > 0 else 0
    return kl_div
```

Step 2: Integrate KL Divergence Calculation in the/Process Route

Locate the section in the/process route where the frequencies of the leading digits (both first and first two digits if applicable) have been computed. After calculating these frequencies and converting them into probabilities, calculate the KL divergence.

Calculate Benford's Expected Frequencies for the First Digit:

```
benfords_law = [math.log10(1 + 1.0/d) for d in range (1, 10)]
```

Calculate KL Divergence after Computing Actual Digit Probabilities:

This is done after leading_digit_prob, sec_leading_digit_prob, and potentially other digit probabilities are computed if analyzing multiple types of digits.

One should have code that looks like this after computing digit probabilities:

```
#Assuming leading_digit_prob is calculated somewhere
    in code
leading_digit_prob=np.asarray(first_digit_freq)/sum
    (first_digit_freq)
#Calculate KL divergence for the first leading digit
kl_divergence_first=calculate_kl_divergence(np.array
    (benfords_law), leading_digit_prob)
print("KL Divergence for the first digit:", kl_
    divergence_first)
#Optionally, do the same for the first two digits if handled
#benfords_law_twodigit=calculate_benford_for_
    two_digits( ) #One would need to define this function
#kl_divergence_two_digits=calculate_kl_divergence
    (benfords_law_twodigit, first_two_digit_prob)
#print("KL Divergence for the first two digits:", kl_diver-
    gence_two_digits)
```

Step 3: Add KL Divergence Results to Response

After calculating the KL divergence, include these results in the Flask route's response. For example, if returning a rendered template, pass the KL divergence values to the template:

```
return render_template('results.html',
    kl_divergence_first=kl_divergence_first, . . . )
```

Another Note:

Handle zero probabilities correctly in the KL divergence calculation to avoid computation errors due to log(0). The conditional check in the calculate_kl_divergence function is designed to handle these cases.

This method integrates seamlessly into an existing Flask route for processing PCAP files, enhancing anomaly detection capability by quantitatively measuring how the observed frequencies diverge from expected frequencies according to Benford's Law.

Referring to FIG. 16, a graphical user interface (GUI) 1600 for implementing one or more of the aspects of the systems and methods described herein is shown. The NeuroBenford GUI Application is designed to provide a comprehensive user interface for monitoring network traffic and identifying anomalous behaviors through the application of Benford's Law, integrated with advanced machine learning techniques. The following is a narrative description based on the above image describing the GUI interactions:

Overview of the NeuroBenford GUI Application

The NeuroBenford GUI offers a dynamic and interactive interface, making it an essential tool for cybersecurity analysts engaged in defensive cyber operations. The GUI is structured to facilitate both real-time and retrospective analysis of network traffic, ensuring analysts can react promptly to threats and understand past incidents.

Key Components and Functionalities

PCAP and Zeek Log Input: The GUI allows users to input PCAP files directly or utilize Zeek logs for traffic analysis. This dual capability ensures flexibility in handling different data sources for comprehensive network monitoring.

Initial Analysis and Pre-processing: Once data is loaded, initial analysis is conducted where the application applies Benford's Law to quickly sift through data, flagging PCAPs that deviate from expected patterns. This step is crucial for filtering out regular traffic and focusing on potential threats.

Pre-processing includes data filtering and initial handling to prepare the data for more detailed analysis, optimizing the performance and accuracy of subsequent processes.

Data Aggregation and In-depth Analysis: Data from various sources is aggregated, providing a unified view that facilitates deeper analysis. At this stage, advanced machine learning models are employed, including the application of the Koopman operator for dynamic analysis and the ensemble model (voting classifier) which integrates results from multiple models to classify the traffic into categories like benign or anomalous.

Trend Analysis and Machine Learning: The GUI includes pop-up plots that display results from machine learning analyses. These plots illustrate trends and patterns using metrics such as chi-square, Euclidean distance, MAD, and the Kullman-Leibler divergence.

These insights are crucial for understanding the nature of the traffic and the effectiveness of the applied models.

Response Formulation: Based on the analysis, the application formulates responses. This could range from alerts to stakeholders about detected anomalies to automated adjustments in network configurations to mitigate potential threats.

Enhancing Decision Making: The GUI is designed to enhance decision-making processes by providing clear, actionable insights derived from complex data analyses. It presents this information through intuitive visualizations and structured data presentations that make interpreting and responding to data straightforward.

Management and Control: For ongoing operations and management, the GUI supports functionalities that allow for system configuration updates, report generation, and real-time monitoring dashboards. This centralized control ensures that adjustments to defensive strategies can be made swiftly and based on the latest data insights.

Diagram and Visual Tools: The GUI would typically feature visual tools like histograms and scatter plots to represent the frequency versus leading digits and other statistical analyses. These tools are vital for visually pinpointing anomalies and understanding data distributions.

Referring to FIG. 17, an architecture for an exemplary system 1700 is shown. The exemplary system 1700 can be known, in some embodiments, as "The NeuroBenford" system. The exemplary system 1700 may include three primary layers: edge layer 1702, core layer 1704, and cloud layer 1706. Each layer can be designed to handle specific tasks and operations, facilitating efficient data flow and processing from the edge (where data can be captured) to the cloud (where data can be stored and analyzed on a large scale). Aspects of the processes described above may be involved in all three layers.

Edge Layer

The edge layer 1702 may be where data acquisition begins, specifically with the capture of PCAP files 1710 from network traffic. Here, the Benford application is deployed on local devices or microsensors that capture and preprocess data. This involves initial analysis using Benford's Law to detect anomalies in network traffic (using the first leading digit and the first two leading digits). The application is capable of both real-time and batch processing of network traffic.

Components:

1. PCAP Capture 1710: Network packets are captured in real-time or from stored data.
2. Benford Analysis 1712: Initial analysis using Benford's Law is applied to identify anomalous PCAP files.

3. Preprocessing 1714: Data is filtered and preprocessed for further analysis. Only data flagged for potential anomalies is sent forward to conserve bandwidth and focus resources.

Core Layer

The core layer 1704 serves as the operational backbone, hosting the Defensive Cyber Operations platform's main processing units. This layer takes the preprocessed data from the edge and performs deeper analysis to possibly zero in on the anomalous packets.

Components:

1. Data Aggregation 1720: Data from one or more edge devices can be collected and aggregated. There is no theoretical limit to the number of edge devices from which data can be collected and aggregated.
2. In-depth Analysis 1724: Using advanced algorithms and machine learning models, the system performs detailed analysis to confirm anomalies and extract additional insights (this would also include the use of NeuroBenford at this level in addition to its use at the edge).
3. Response Formulation 1726: Based on the analysis, responses such as alerts or commands to adjust system configurations are formulated.

Cloud Layer

The cloud layer 1706 is responsible for long-term data storage, trend analysis, and overarching management of deployed systems across various sites. It supports higher-order analytics and houses central databases and application logic.

Components:

1. Data Storage 1730: All data, analyzed and raw, is stored for historical analysis and backup.
2. Big Data Analytics 1732: Performs extensive analytics operations, including trend analysis and predictive analytics to anticipate future anomalies (NeuroBenford is also be applied at this level).
3. Management and Control 1734: Hosts web interfaces for user interaction, system configuration, and report generation. It also provides centralized control over edge and core components.

Communication and Security

Security: Each layer implements robust security measures to protect against unauthorized access and data breaches. This includes encryption, firewalls, and intrusion detection systems.

Communication: The layers communicate over secure channels, with data encrypted during transmission. Edge devices use lightweight protocols for efficiency, while core and cloud layers use more robust communication protocols.

Integration Points

Zeek Integration: At the edge, Zeek logs can be integrated for enhanced network traffic analysis.

MITRE ATT&CK Framework: The architecture aligns with the MITRE ATT&CK framework for cybersecurity, using tactics and techniques applicable across the layers for threat modeling and defense.

Data Flow: Continuous, real-time data flow is maintained from edge to cloud, ensuring that the system can respond swiftly to detected anomalies.

In summary, this description of the architecture provides a solid foundation for creating a comprehensive OV-1 architecture diagram for the NeuroBenford application, integrated with a Defensive Cyber Operations Core Layer. Each component and layer is designed to work seamlessly to ensure efficient, secure, reliable network anomaly detection and network analysis.

In some embodiments, a NeuroBenford Toolkit may merge principles of neuroscience, neural networks, or advanced machine learning algorithms with Benford's Law to analyze data patterns. The NeuroBenford Toolkit may be ideally suited for data scientists, statisticians, and professionals in fields such as finance, auditing, cybersecurity, and research who require advanced tools to detect anomalies or patterns in large datasets. By integrating neural network technology with Benford's Law, the toolkit can provide a powerful means of analyzing numbers and identifying irregularities that could be signs of underlying issues such as fraudulent transactions in financial data, manipulated information in scientific datasets, or unusual traffic in network analysis.

This toolkit can automate and enhance the detection process, providing faster, more accurate insights than traditional statistical methods alone. It's particularly useful in environments where the integrity of data is critical, and there is a need for ongoing monitoring and analysis.

Potential Features and Benefits:

Automated Anomaly Detection: Quickly scans large volumes of data to find discrepancies that deviate from expected patterns according to Benford's Law.

Predictive Analytics: Uses machine learning to predict future trends based on historical data adherence or deviation from Benford's Law.

Customizable Analysis Parameters: Allows users to tailor the analysis to specific digits, data types, or detection methods based on their unique data sets and needs.

Intuitive Dashboards: Provides visual representations of data compliance or deviations from Benford's Law, making it easier to identify and understand anomalies.

Real-Time Monitoring: Offers capabilities to monitor data streams in real-time, providing immediate alerts to potential fraud or data manipulation The following examples illustrate particular properties and advantages of some of the embodiments of the present technology. Furthermore, these are examples of reduction to practice of the present technology and confirmation that the principles described in the present technology are therefore valid but should not be construed as in any way limiting the scope of the technology.

While the present technology has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The technology in its broader aspects is therefore not limited to the specific details, representative apparatus and method, and illustrative examples shown and described. Accordingly, departures may be made from such details without departing from the scope of the general inventive concept.

I claim:

1. A method of determining anomalous Internet traffic using Benford's Law comprising:

defining a time window across which to apply a Poisson distribution;

modeling expected Internet traffic including, at least, an average rate of requests per unit time, using the Poisson distribution based on historical traffic data for one or more multiples of the time window;

recording data related to real time Internet traffic for, at least, one multiple of the time window;

analyzing the data related to the real time Internet traffic to include extracting lead digits from one or more parameters of the data related to real time Internet traffic including:

calculating a frequency distribution of the extracted lead digits;

comparing the calculated frequency distribution of the extracted lead digits to a Benford's Curve distribution;

comparing the calculated frequency distribution of the extracted lead digits to the modeled expected Internet traffic; and identifying deviations of the compared frequency distribution to the Benford's Curve and the modeled expected Internet traffic.

2. The method of claim 1, wherein the data related to real time Internet traffic includes one or more of packet inter-arrival times, PCAPs, Zeek logs, request rates, byte counts, and IP address origins.

3. The method of claim 1, wherein the data related to real time Internet traffic includes packet size, timing, and payload content.

4. The method of claim 1, wherein the data related to real time Internet traffic includes one or more of inter-arrival times of TCP SYN packets, UDP packets, and flow sizes.

5. The method of claim 1, wherein deviations of the compared frequency distribution to the Benford's Curve and the modeled expected Internet traffic are identified based on a Chi-square disparity between expected and observed data distributions.

6. The method of claim 1, wherein deviations of the compared frequency distribution to the Benford's Curve and the modeled expected Internet traffic are identified based on a Euclidean Distance disparity between expected and observed data distributions.

7. A method of differentiating benign and malicious internet traffic using Benford's Law and Poisson process, comprising:

defining a time window across which to apply a Poisson distribution;

modeling expected Internet traffic including, at least, an average rate of requests per unit time, using the Poisson distribution based on historical traffic data for one or more multiples of the time window;

recording data related to real time Internet traffic for, at least, one multiple of the time window;

analyzing the data related to the real time Internet traffic to include extracting lead digits from one or more parameters of the data related to real time Internet traffic, including:

calculating a frequency distribution of the extracted lead digits;

comparing the calculated frequency distribution of the extracted lead digits to a Benford's Curve distribution;

comparing the calculated frequency distribution of the extracted lead digits to the modeled expected Internet traffic; and identifying deviations of the compared frequency distribution to the Benford's Curve and the modeled expected Internet traffic using a deep learning model.

8. The method of claim 7, wherein the deep learning model is a supervised learning model.

9. The method of claim 8, wherein the deep learning model uses one or more hidden layers.

10. The method of claim 9, wherein the deep learning model uses layers containing at least 20 neurons.

11. The method of claim 7, wherein the deep learning model is an unsupervised learning model.

12. A method of determining anomalous Internet traffic using Benford's Law comprising:

defining a time window across which to apply a Poisson distribution;

modeling expected inter-arrival times of packets from Internet traffic using the Poisson distribution based on historical traffic data for one or more multiples of the time window;

recording data related to the inter-arrival times for, at least, one multiple of the time window;

analyzing the inter-arrival times to include extracting lead digits from one or more parameters of the data related to the inter-arrival times including:

calculating a frequency distribution of the extracted lead digits;

comparing the calculated frequency distribution of the extracted lead digits to a Benford's Curve distribution;

comparing the calculated frequency distribution of the extracted lead digits to the modeled expected inter-arrival times; and identifying deviations of the compared frequency distribution to the Benford's Curve and the modeled expected inter-arrival times.

13. The method of claim 12, further comprising:

determining an M/M/1 queuing model for expected inter-arrival times of packets from Internet traffic using the Poisson distribution based on historical traffic data for one or more multiples of the time window;

comparing actual inter-arrival times of packets from Internet traffic to expected inter-arrival times of packets from Internet traffic based on the M/M/1 queuing model; and identifying malicious internet traffic based on the comparison between the actual inter-arrival times of packets from Internet traffic with the expected inter-arrival times of packets based on the M/M/1 queuing model, wherein malicious internet traffic is identified if the inter-arrival times of packets exceeds a burst threshold.

14. The method of claim 12, further comprising:

determining an M/G/1 queuing model for expected inter-arrival times of packets from Internet traffic using the Poisson distribution based on historical traffic data for one or more multiples of the time window;

comparing actual inter-arrival times of packets from Internet traffic to expected inter-arrival times of packets from Internet traffic based on the M/M/1 queuing model; and identifying malicious internet traffic based on the comparison between the actual inter-arrival times of packets from Internet traffic with the expected inter-arrival times of packets based on the M/G/1 queuing model, wherein malicious internet traffic is identified if the inter-arrival times of packets exceeds a burst threshold.

15. The method of claim 12, wherein in addition to inter-arrival times of packets, the identifying of malicious Internet traffic is also based on one or more of: PCAPs, Zeek logs; request rates; byte counts; and IP address origins.

* * * * *